United States Patent
Lee et al.

(10) Patent No.: US 8,169,923 B2
(45) Date of Patent: May 1, 2012

(54) POWER LINE COMMUNICATION METHOD AND APPARATUS

(75) Inventors: Joon-hee Lee, Gunpo-si (KR); Ju-han Lee, Suwon-si (KR); Jun-hae Choi, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1546 days.

(21) Appl. No.: 11/528,385

(22) Filed: Sep. 28, 2006

(65) Prior Publication Data

US 2007/0076595 A1 Apr. 5, 2007

(30) Foreign Application Priority Data

Sep. 30, 2005 (KR) .................. 10-2005-0092204
Mar. 31, 2006 (KR) .................. 10-2006-0029811

(51) Int. Cl.
*H04L 12/26* (2006.01)
(52) U.S. Cl. ...................................... 370/247; 340/538
(58) Field of Classification Search .......... 370/246–249; 340/538
See application file for complete search history.

(56) References Cited

U.S. PATENT DOCUMENTS

| 5,343,320 | A | * | 8/1994 | Anderson | 398/157 |
| 5,848,054 | A | * | 12/1998 | Mosebrook et al. | 370/226 |
| 7,003,102 | B2 | * | 2/2006 | Kiko | 379/413 |
| 7,224,272 | B2 | * | 5/2007 | White et al. | 370/419 |
| 2002/0120569 | A1 | * | 8/2002 | Day | 705/40 |
| 2004/0024913 | A1 | * | 2/2004 | Ikeda et al. | 709/249 |
| 2004/0142599 | A1 | * | 7/2004 | Cope et al. | 439/620 |
| 2004/0146013 | A1 | * | 7/2004 | Song et al. | 370/279 |

FOREIGN PATENT DOCUMENTS

KR 2003-57270 7/2003

OTHER PUBLICATIONS

Korean Office Action dated Jan. 23, 2007 issued in KR 2006-29811.

* cited by examiner

*Primary Examiner* — Phuc Tran
(74) *Attorney, Agent, or Firm* — Stanzione & Kim, LLP

(57) ABSTRACT

A power line communication (PLC) method includes determining whether a destination communication apparatus to receive a data packet can directly communicate without using a repeater, transmitting the data packet to the destination communication apparatus when the destination communication apparatus can directly communicate without using the repeater, and transmitting the data packet to the repeater when the destination communication apparatus cannot directly communicate without using the repeater, and a power line communication (PLC) apparatus to perform the method.

28 Claims, 16 Drawing Sheets

POWER LINE COMMUNICATION METHOD AND APPARATUS

CROSS-REFERENCE TO RELATED APPLICATIONS

This application claims priority under 35 U.S.C. §119(a) from Korean Patent Applications Nos. 10-2006-0029811 and 10-2005-0092204, filed on Mar. 31, 2006, and Sep. 30, 2006, respectively, in the Korean Intellectual Property Office, the disclosures of which are incorporated herein in their entireties by reference.

BACKGROUND OF THE INVENTION

1. Field of the Invention

The present general inventive concept relates to a power line communication (PLC) method and apparatus, and more particularly, to transmission of data packets using a repeater in a PLC method and apparatus.

2. Description of the Related Art

Power line communication (PLC) is a type of communication in which data is transmitted over power lines. In PLC, a data signal is carried on a 60 Hz sine wave of a common alternating current (AC) power supply for communication. Thus, all power supply lines in homes or offices serve as communication lines, and thus a communication network can be established without a need to install separate communication lines.

Since it is conventionally understood that a communication distance allowed by PLC technology is more than 100 m, problems with PLC do not occur in most homes in theory. However, in practice, there may be an electrical outlet in a position having a poor communication state due to a wiring structure on the premises or load generated in a cabinet panel. In this case, a repeater function used in an access network may be a solution for this problem. However, when a repeater is simply used, a specific communication device should communicate via the repeater all the time, and thus communication devices, though being capable of efficiently communicating with each other without using the repeater, are likely to perform communication via the repeater. In this case, by using the repeater, communication efficiency is degraded. Therefore, there is a need for a technique capable of selectively repeating communication between communication devices having link qualities that are lower than a threshold level.

Even when a repeater is used, a user's direct setting is required, resulting in low efficiency. In other words, the user should directly check non-communication between two stations and directly set the repeater between the stations. Moreover, since different group IDs (GIDs) should be set, the repeater cannot be used within the same group.

SUMMARY OF THE INVENTION

The present general inventive concept provides a power line communication (PLC) method and apparatus in which a repeater is selectively used according to a determination of whether the repeater is required in the PLC method and apparatus.

The present general inventive concept also provides a computer-readable recording medium having recorded thereon a program to implement the PLC method on a computer.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a PLC method, including determining whether a destination communication apparatus to receive a data packet can directly communicate without using a repeater, transmitting the data packet to the destination communication apparatus when it is determined that the destination communication apparatus can directly communicate without using the repeater, and transmitting the data packet to the repeater when it is determined that the destination communication apparatus cannot directly communicate without using the repeater.

The foregoing and/or other aspects and utilities of the present general inventive concept may also be achieved by providing a PLC apparatus, including a repeater usage determining unit to determine whether a destination communication apparatus to receive a data packet can directly communicate without using a repeater, and a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater.

The foregoing and/or other aspects and utilities of the present general inventive concept may also be achieved by providing a power line communication apparatus to transmit a data package to a destination station, the power line communication apparatus including a determining unit to automatically determine whether the destination station can directly communicate with the power line communication apparatus, and a transmitting unit to selectively transmit the data packet directly or indirectly to the destination station based on the determination of the determining unit.

The transmitting unit may transmit the data package directly to the destination station when the determining unit determines that the destination station can directly communicate with the power line communication apparatus, and the transmitting unit may transmit the data package indirectly to the destination station through a repeater when the determining unit determines that the destination station cannot directly communicate with the power line communication apparatus. The data packet may include source address information of the power line communication apparatus and destination address information of the destination station or the repeater. The data packet may include a repeater mode function indicating whether to transmit the data packet directly to the destination station or the repeater.

The foregoing and/or other aspects and utilities of the present general inventive concept may also be achieved by providing a power line communication system, including a plurality of power line communication stations, and a repeating unit to selectively repeat transmissions between stations of the plurality of power line communication stations having link qualities that do not satisfy a predetermined threshold condition or stations that cannot directly communicate with each other.

At least one station of the plurality of power line communication stations may include a determining unit to automatically determine whether a destination station of the plurality of power line communication stations can directly communicate with the at least one station, and a transmitting unit to selectively transmit a data packet directly or indirectly to the destination station based on the determination of the determining unit. The power line communication system may further include a coordinating unit to coordinate a medium access of the plurality of power line communication stations, and to periodically transmit scheduling information associated with the coordination to the plurality of power line communication stations through one or more beacon messages. The plurality of power line communication stations, the repeating unit, and the coordinating unit may be connected to form a network.

At least one station of the plurality of power line communication stations may periodically measure link qualities of the plurality of power line communication stations and the repeating unit, and may manage addresses and link qualities of the plurality of power line communication stations and of the repeating unit. The at least one station may measure the link qualities using response packets received in response to explorer packages broadcast to the plurality of power line communication stations by the at least one station. The at least one station may selectively transmit a data packet to a destination station of the plurality of power line communication stations via the repeating unit when the measured link quality of the destination station does not satisfy the predetermined threshold condition. The repeating unit may periodically measure the link qualities of the plurality of power line communication stations, and may manage the addresses and the link qualities of the plurality of power line communication stations. The at least one station may selectively transmit a data packet to a destination station of the plurality of power line communication stations via the repeating unit when the address and link quality of the destination station is not managed by the at least one station and is managed by the repeating unit.

The foregoing and/or other aspects and utilities of the present general inventive concept may also be achieved by providing a power line communication method of a power line communication system including a plurality of power line communication stations and a repeating unit, the method including selectively repeating transmissions between stations of the plurality of power line communication stations having link qualities that do not satisfy a predetermined threshold condition or stations that cannot directly communicate with each other using the repeater.

The foregoing and/or other aspects and utilities of the present general inventive concept may also be achieved by providing a power line communication method, including determining whether directly communicating data packets to a destination communication apparatus should be performed based on information determined with respect to the destination communication apparatus, and transmitting the data packets to either the destination communication apparatus or to a repeater based on the determined information. The determined information may include a link quality of the destination communication apparatus. The determined information may include an address of the destination communication apparatus.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
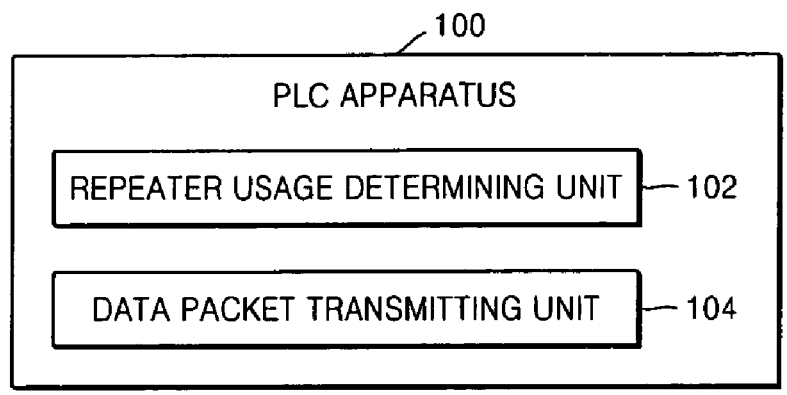
FIG. 1 is a block diagram illustrating a power line communication (PLC) apparatus, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a power line communication (PLC) apparatus 100, according to an embodiment of the present general inventive concept. Referring to FIG. 1, the PLC apparatus 100 includes a repeater usage determining unit 102 and a data packet transmitting unit 104.

The repeater usage determining unit 102 determines whether a destination PLC apparatus to receive a data packet from the PLC apparatus 100 can directly communicate with the PLC apparatus 100 without using a repeater, i.e., determines whether to use the repeater during transmission of the data packet.

The data packet transmitting unit 104 selectively transmits the data packet from the PLC apparatus 100 to the destination PLC apparatus according to whether the repeater is used. In other words, when the destination PLC apparatus can directly communicate with the PLC apparatus 100, the data packet transmitting unit 104 directly transmits the data packet to the destination PLC apparatus. However, if the destination PLC apparatus cannot directly communicate with the PLC apparatus 100, i.e., if the data packet can be transmitted only using the repeater, the data packet transmitting unit 104 transmits the data packet to the repeater to be transmitted from the repeater to the destination PLC apparatus.

Figure 2:
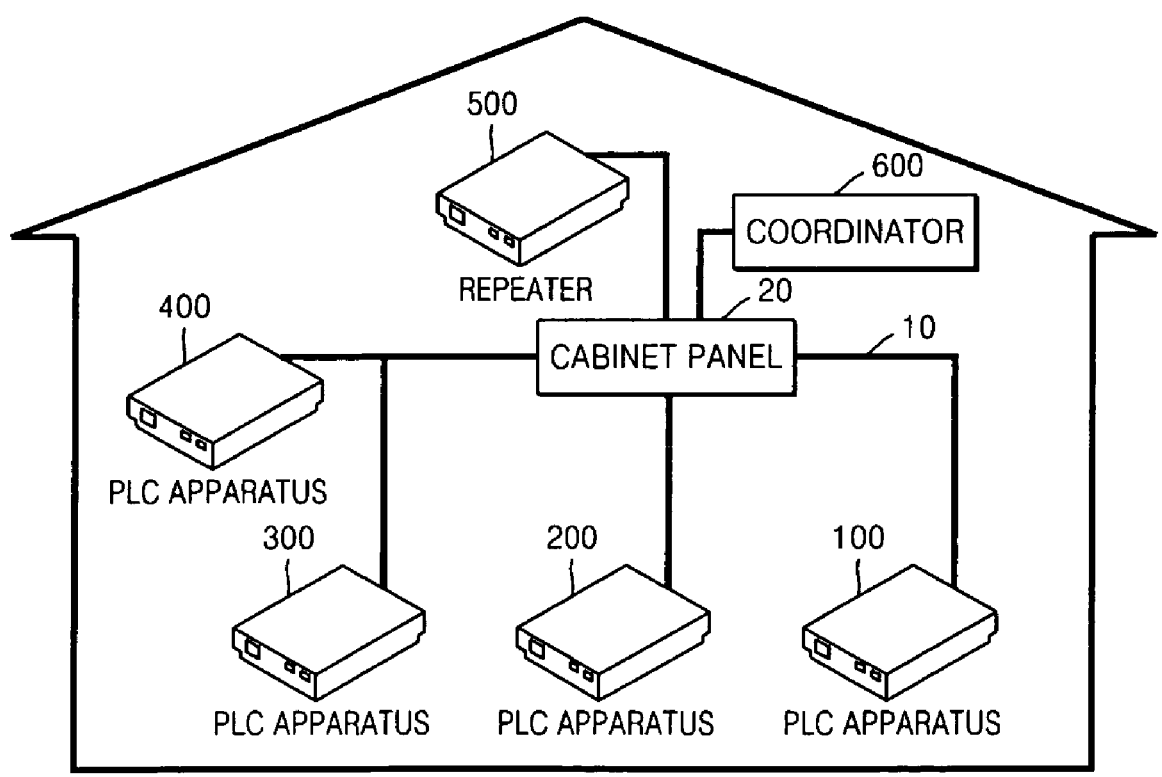
FIG. 2 is a view illustrating a PLC system, according to an embodiment of the present general inventive concept.

FIG. 2 is a view illustrating a PLC system, according to an embodiment of the present general inventive concept.

The PLC system includes at least one of the PLC apparatus 100, PLC apparatus 200, PLC apparatus 300, PLC apparatus 400, and a repeater 500. The PLC system may further include a coordinator 600.

The PLC apparatuses 100, 200, 300, and 400, the repeater 500, and the coordinator 600 may be connected to one another to construct a PLC network.

In the present embodiment, the PLC apparatuses 100, 200, 300, and 400 may be external PLC modems that can be connected to electronic appliances (such as a digital TV, an air conditioner, and a microwave oven) or office machines (such as a computer and a printer) and can perform a PLC method. However, the PLC apparatuses 100, 200, 300, and 400 may be electronic appliances or office machines having a PLC function.

The repeater 500 and the coordinator 600 can also perform a PLC method.

The repeater 500 can repeat communication between PLC apparatuses having link qualities that are lower than a threshold value or PLC apparatuses that cannot directly communicate with each other. In other words, the repeater 500 may serve as a repeater, a bridge, and/or a router in the PLC network. To this end, the repeater 500 should be located in a place that allows communication with all of the PLC apparatuses 100, 200, 300, and 400 in the PLC system illustrated in FIG. 2. Thus, the repeater 500 may be installed around a cabinet panel 20 that branches off indoor wiring from a trunk line in order to deliver power supplied from an exterior of a home to everywhere in an interior of the home. The term "home" can refer to a residence or dwelling, such as a house, an apartment, a condominium, a townhouse, a town home, and the like, or any building with office rooms, where a power line communication cells may be located.

The coordinator 600 may coordinate a medium access of PLC apparatuses in a cell. The coordinator 600 may also periodically transmit scheduling information associated with the coordination to the PLC apparatuses in the cell through a beacon message.

Hereinafter, the present general inventive concept will be described based on the PLC apparatus 100. Thus, the configurations and operations of the other PLC apparatuses 200, 300, and 400 should be construed to be the same as or similar to those of the PLC apparatus 100 described below.

The PLC apparatus 100 may periodically measure link qualities of the PLC apparatuses 200, 300, and 400, and the repeater 500. The PLC apparatus 100 may also manage communication information, including addresses of the PLC apparatuses 200, 300, and 400, and the repeater 500, and the measured link qualities of the PLC apparatuses 200, 300, and 400, and the repeater 500. If there is a PLC apparatus having a link quality that does no satisfy a threshold condition (i.e., a low-link quality PLC apparatus), the PLC apparatus 100 transmits a data packet to the low-link quality PLC apparatus via the repeater 500. For example, if a link quality for the PLC apparatus 300 does not satisfy a threshold condition, the PLC apparatus 100 transmits a data packet first to the repeater 500, and the repeater 500 then transmits the data packet to the PLC apparatus 300.

In addition, the repeater 500 may periodically measure link qualities of the PLC apparatuses 100, 200, 300, and 400. The repeater 500 may also manage communication information, including addresses of the PLC apparatuses 100, 200, 300, and 400 and the measured link qualities of the PLC apparatuses 100, 200, 300, and 400. In the case of a PLC apparatus whose information is not included in the communication information managed by the PLC apparatus 100, but whose presence in the PLC network can be checked through the communication information managed by the repeater 500, (i.e., a missing information PLC apparatus) the PLC apparatus 100 transmits a data packet to the missing information PLC apparatus via the repeater 500. For example, if the link quality for the PLC apparatus 400 is not included in the communication information managed by the PLC apparatus 100, but is included in the communication information managed by the repeater 500, the PLC apparatus 100 transmits a data packet to the repeater 500, and the repeater 500 transmits the data packet to the PLC apparatus 400.

Various embodiments to transmit a data packet to a PLC apparatus via the repeater 500 are applicable. For example, the PLC apparatus 100 may transmit a data packet via the repeater 500 using data packet structures as illustrated in FIGS. 3 and 4, discussed below.

Figure 3:
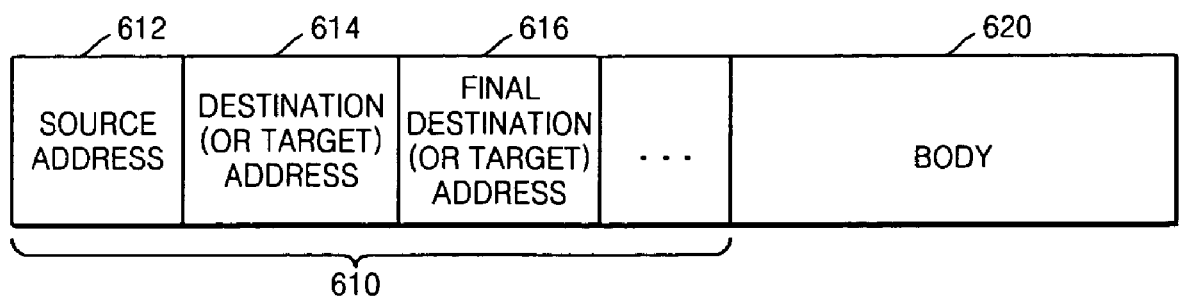
FIG. 3 is a view illustrating a data packet, according to an embodiment of the present general inventive concept.
Figure 4:
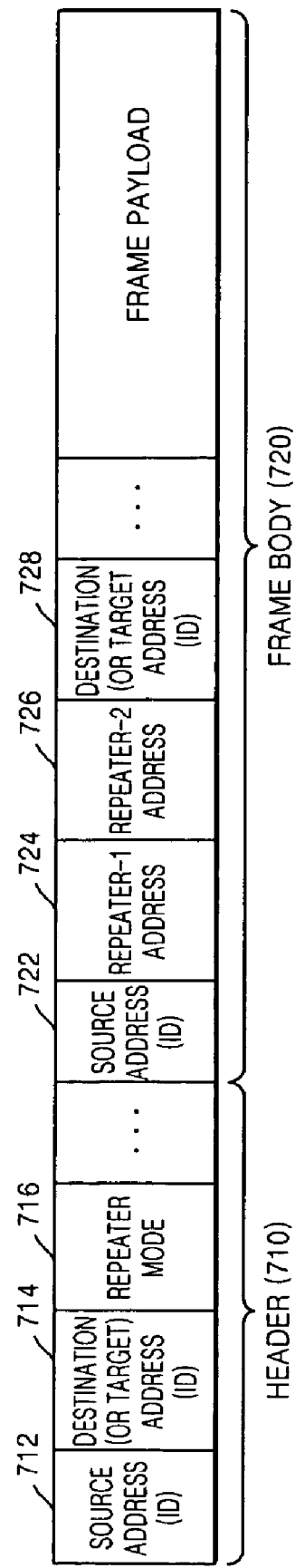
FIG. 4 is a view illustrating a data packet, according to another embodiment of the present general inventive concept.

FIG. 3 is a view illustrating a data packet, according to an embodiment of the present general inventive concept.

The data packet illustrated in FIG. 3 includes a body 620 including transmission data, and a header 610 including a source address field 612, a destination (or target) address field 614, and a final destination (or target) address field 616.

An address of the PLC apparatus 100 to transmit the data packet is set in the source address field 612.

If the data packet is to be transmitted via the repeater 500 (i.e., indirectly transmitted), the address of the repeater 500 is set in the destination address field 614 and the address of a destination PLC apparatus is set in the final destination address field 616. If the PLC apparatus 100 generates the data packet and outputs the data packet to a power line 10 (see FIG. 2), the repeater 500 receives the data packet. At this time, the repeater 500 can obtain the address of the destination PLC apparatus through the final destination address field 616 of the data packet. The repeater 500 may output the data packet to the power line 10 (see FIG. 2) after setting the destination address field 614 as the address of the destination PLC apparatus and setting the final destination address field 616 to null, and thus the destination PLC apparatus finally receives the data packet.

If the data packet is transmitted directly to the destination PLC apparatus, the address of the destination PLC apparatus is set in the destination address field 614 and the final destination address field 616 is set to null. If the PLC apparatus 100 generates the data packet and outputs the data packet to the power line 10 (see FIG. 2), the data packet can be transmitted directly to the destination PLC apparatus without passing through the repeater 500.

FIG. 4 is a view illustrating a data packet, according to another embodiment of the present general inventive concept. Referring to FIG. 4, the data packet includes a header 710 and a frame body 720.

The header 710 illustrated in FIG. 4 includes a source address field 712, a destination (or target) address field 714, and a repeater mode field 716. The frame body 720 illustrated in FIG. 4 includes a source address field 722, at least one of repeater address fields 724 and 726 (for example, repeater-1 address field 724 and repeater-2 address field 726), and a destination (or target) address field 728. In FIG. 4, the data packet can be transmitted via a maximum of up to 2 repeaters.

If the data packet is to be transmitted via the repeater 500 (i.e., indirectly transmitted), the address of the PLC apparatus 100 to transmit the data packet is set in the source address field 712, the address of the repeater 500 is set in the destination address field 714, and an activation value is set in the repeater mode field 716. The frame body 720 includes the following contents. The address of the PLC apparatus 100 is set in the source address field 722 and the address of a final destination PLC apparatus is set in the destination address field 728. The address of the repeater 500 is set in the repeater-1 address field 724.

If the PLC apparatus 100 generates the data packet and outputs the data packet to the power line 10 (see FIG. 2), the repeater 500 receives the data packet. If the other PLC apparatuses 200, 300, and 400 receive a data packet having an activation value set in the repeater mode field 716, they drop the data packet. The repeater 500 that receives the data packet having the activation value set in the repeater mode field 716 modifies field values of the header 710 by referring to the fields of the frame body 720 and transmits the modified data packet. For example, the repeater 500 sets the address of the repeater 500 in the source address field 712, the address of a destination PLC apparatus in the destination address field 714, and an activation value in the repeater mode field 716, and outputs the data packet to the power line 10 (see FIG. 2). Thus, the destination PLC apparatus can finally receive the data packet.

On the other hand, if the data packet is transmitted directly to the destination PLC apparatus without passing through the repeater 500, the address of the PLC apparatus 100 that transmits the data packet is set in the source address field 712, the address of the destination PLC apparatus is set in the destination address field 714, and a deactivation value is set in the repeater mode field 716. If the PLC apparatus 100 generates the data packet and outputs the data packet to the power line 10 (see FIG. 2), the data packet can be transmitted directly to the destination PLC apparatus without passing through the repeater 500.

Here, the activation value and the deactivation value set in the repeater mode field 716 may vary according to embodiments. For example, if one bit is assigned for the repeater mode field 716, the activation value may be '1' and the deactivation value may be '0'.

Hereinafter, the PLC apparatus 100 and the repeater 500, according to embodiments of the present general inventive concept, will be described in more detail.

Figure 5:
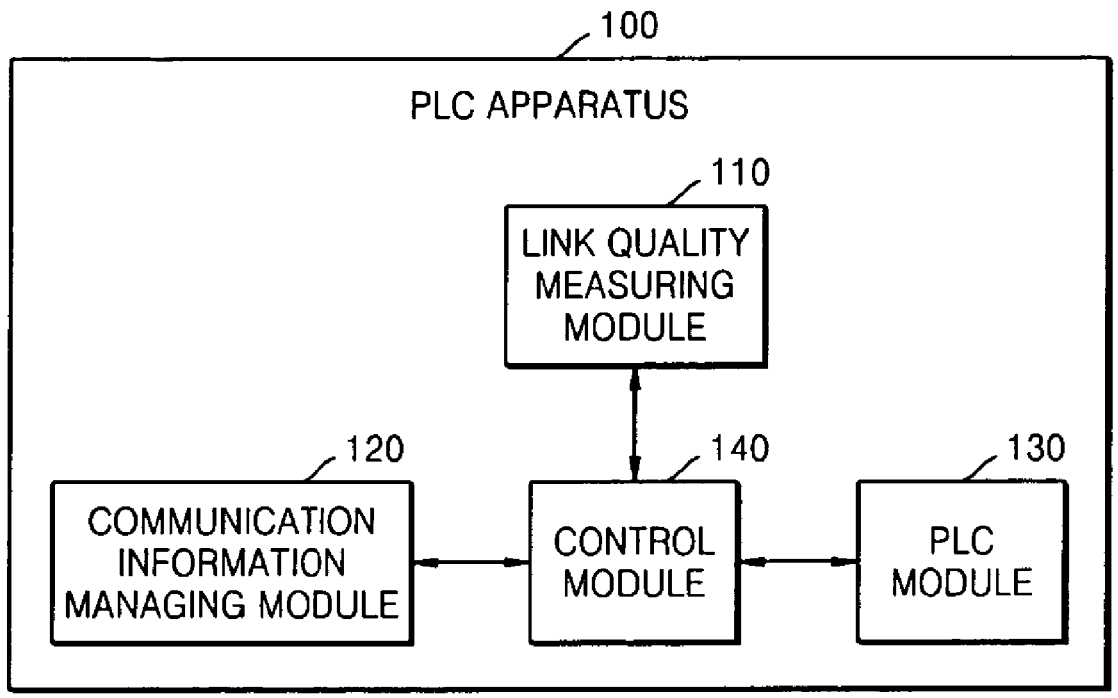
FIG. 5 is a block diagram illustrating a PLC apparatus, according to an embodiment of the present general inventive concept.

FIG. 5 is a block diagram illustrating the PLC apparatus 100, according to an embodiment of the present general inventive concept.

The PLC apparatus 100 illustrated in FIG. 5 includes a link quality measuring module 110, a communication information managing module 120, a PLC module 130, and a control module 140.

The link quality measuring module 110 measures link qualities for the PLC apparatuses 200, 300, and 400 and the repeater 500. The link qualities may be measured using response packets received from the PLC apparatuses 200, 300, and 400 and the repeater 500 with respect to explorer packets broadcasted by the PLC module 130. For example, the link quality may be expressed using a signal to noise ratio (SNR) (measured in decibels dB) or an amount of jitter.

Techniques to measure the link quality are well-known to those of ordinary skill in the art, and thus will not be described.

The communication information managing module 120 manages communication information including the addresses of the PLC apparatuses 200, 300, and 400 and the repeater 500, as well as the measured link qualities of the PLC apparatuses 200, 300, and 400 and the repeater 500. An example of the communication information managed by the communication information managing module 120 can be expressed in the form of a table, such as Table 1.

TABLE 1

| Address | SNR (dB) |
| --- | --- |
| Address of PLC apparatus 200 | 25 |
| Address of PLC apparatus 300 | 30 |
| Address of PLC apparatus 400 | 15 |
| Address of repeater 500 | 27 |

Although SNR is used to express link quality in Table 1, other types of information that can represent link quality, such as an amount of jitter, can be used instead of SNR.

The PLC module 130 communicates with the PLC apparatuses 200, 300, and 400 and the repeater 500 through the power line 10 (see FIG. 2). More specifically, the PLC module 130 broadcasts the explorer packets through the power line 10 (see FIG. 2) and receives the response packets in response to the explorer packets from the PLC apparatuses 200, 300, and 400 and the repeater 500. The PLC module 130 transmits the response packets if received from the PLC apparatuses 200, 300, and 400 and the repeater 500.

The PLC module 130 also transmits a data packet directly to a destination PLC apparatus or to the repeater 500 under the control of the control module 140.

Packets (e.g., data packets, explorer packets, and response packets) transmitted and received by the PLC module 130 may be implemented in various forms according to a PLC standard used by the PLC apparatus 100.

The control module 140 controls the operations of the modules 110, 120, and 130 of the PLC apparatus 100. The control module 140 determines whether a data packet should be transmitted directly to a destination PLC apparatus or indirectly to the destination PLC apparatus via the repeater 500. To this end, the control module 140 may use communication information managed by the communication information managing module 120. For example, if a PLC apparatus whose link quality does not satisfy a threshold condition (i.e., a low-link quality PLC apparatus) is detected from the communication information managed by the communication information, the control module 140 can determine that a data packet destined to be transmitted to the low-link quality PLC apparatus should be transmitted via the repeater 500. However, in the case of a PLC apparatus whose link quality satisfies the threshold condition, the control module 140 performs a control operation so that the data packet can be transmitted directly to the PLC apparatus having the satisfactory link quality.

According to another embodiment of the present general inventive concept, if the communication information managed by the repeater 500 is received by the control module 140 from the repeater 500, the control module 140 compares the received communication information with the communication information managed by the communication information managing module 120. If information about a PLC apparatus is not included in the communication information managed by the communication information managing module 120, but is included in the received communication information managed by the repeater 500, the control module 140 performs a control operation so that a data packet destined to the PLC apparatus is transmitted via the repeater 500. However, in the case of a PLC apparatus whose information is included in both the communication information managed by the communication information managing module 120 and the received communication information managed by the repeater 500, the control module 140 performs a control operation so that the data packet is transmitted directly to the PLC apparatus.

Figure 6:
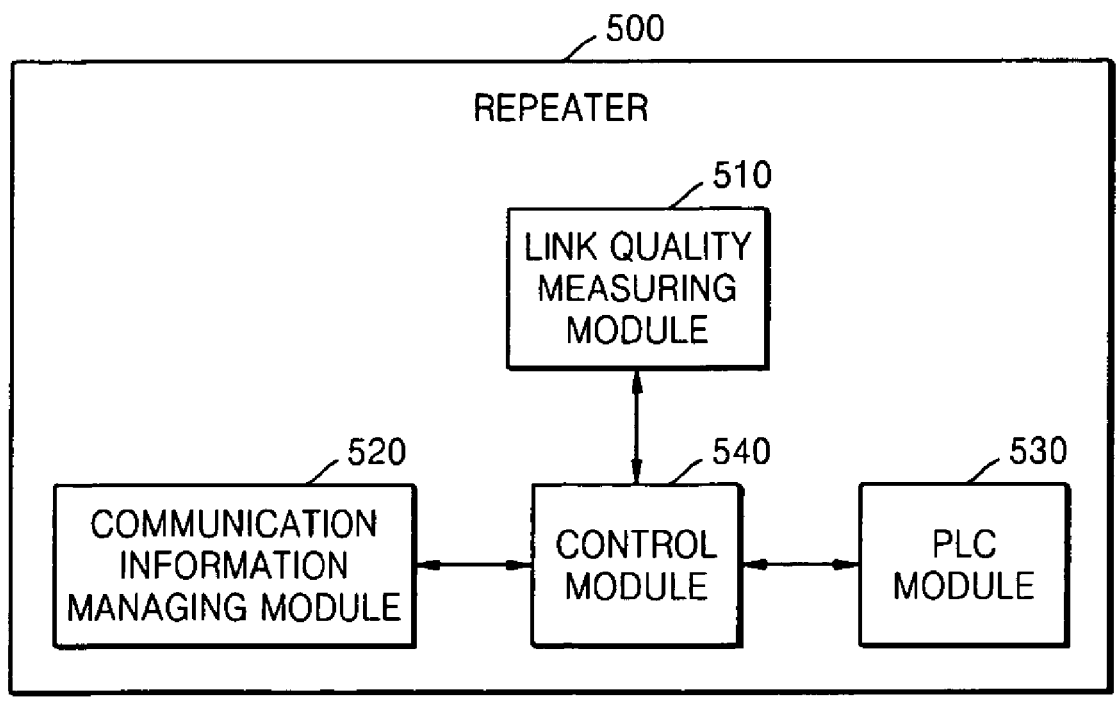
FIG. 6 is a block diagram illustrating a repeater, according to an embodiment of the present general inventive concept.

FIG. 6 is a block diagram illustrating the repeater 500, according to an embodiment of the present general inventive concept.

The repeater 500 illustrated in FIG. 6 includes a link quality measuring module 510, a communication information managing module 520, a PLC module 530, and a control module 540.

The link quality measuring module 510 measures link qualities for the PLC apparatuses 100, 200, 300, and 400. The link qualities can be measured using response packets received from the PLC apparatuses 100, 200, 300, and 400 with respect to explorer packets broadcasted by the PLC module 530. For example, the link qualities may be expressed using an SNR or an amount of jitter.

The communication information managing module 520 manages communication information, including the addresses of the PLC apparatuses 100, 200, 300, and 400 and the measured link qualities for the PLC apparatuses 100, 200, 300, and 400. The communication information managed by the communication information managing module 520 may take a similar form to that expressed in Table 1.

The PLC module 530 communicates with the PLC apparatuses 100, 200, 300, and 400 through the power line 10 (see FIG. 2). More specifically, the PLC module 530 broadcasts the explorer packets and receives the response packets in response to the explorer packets through the power line 10 (see FIG. 2). If the explorer packets are received from the PLC apparatuses 100, 200, 300, and 400, the PLC module 530 transmits the response packets received in response to the explorer packets. The PLC module 530 transmits the communication information managed by the communication information managing module 520 to the PLC apparatuses 100, 200, 300, and 400.

Packets (e.g., data packets, explorer packets, and response packets transmitted and received by the PLC module 530 may be implemented in various forms according to a PLC standard used by the repeater 500.

The control module 540 controls the operations of the modules 510, 520, and 530 of the repeater 500. The control module 540 also controls a control operation so that the communication information managed by the communication information managing module 520 is periodically transmitted to the PLC apparatuses 100, 200, 300, and 400.

Each module of the PLC apparatus 100 and the repeater 500 illustrated in FIGS. 5 and 6 may be implemented in the form of, but without being limited to, software or a hardware component, such as a field programmable gate array (FPGA) or an application specific integrated circuit (ASIC), and can perform a specific operation. However, the modules of the PLC apparatus 100 and the repeater 500 may be included in a storage medium that can be addressed or may operate one or more processors. Thus, the modules may include components such as software components, object-oriented software components, class components, and task components, processes, functions, attributes, procedures, subroutines, segments of program code, drivers, firmware, microcode, circuits, data, a database, data structures, tables, arrays, and parameters. The components and functions provided by the modules may be combined into a smaller number of components and modules or divided into a larger number of components and modules.

Figure 7:
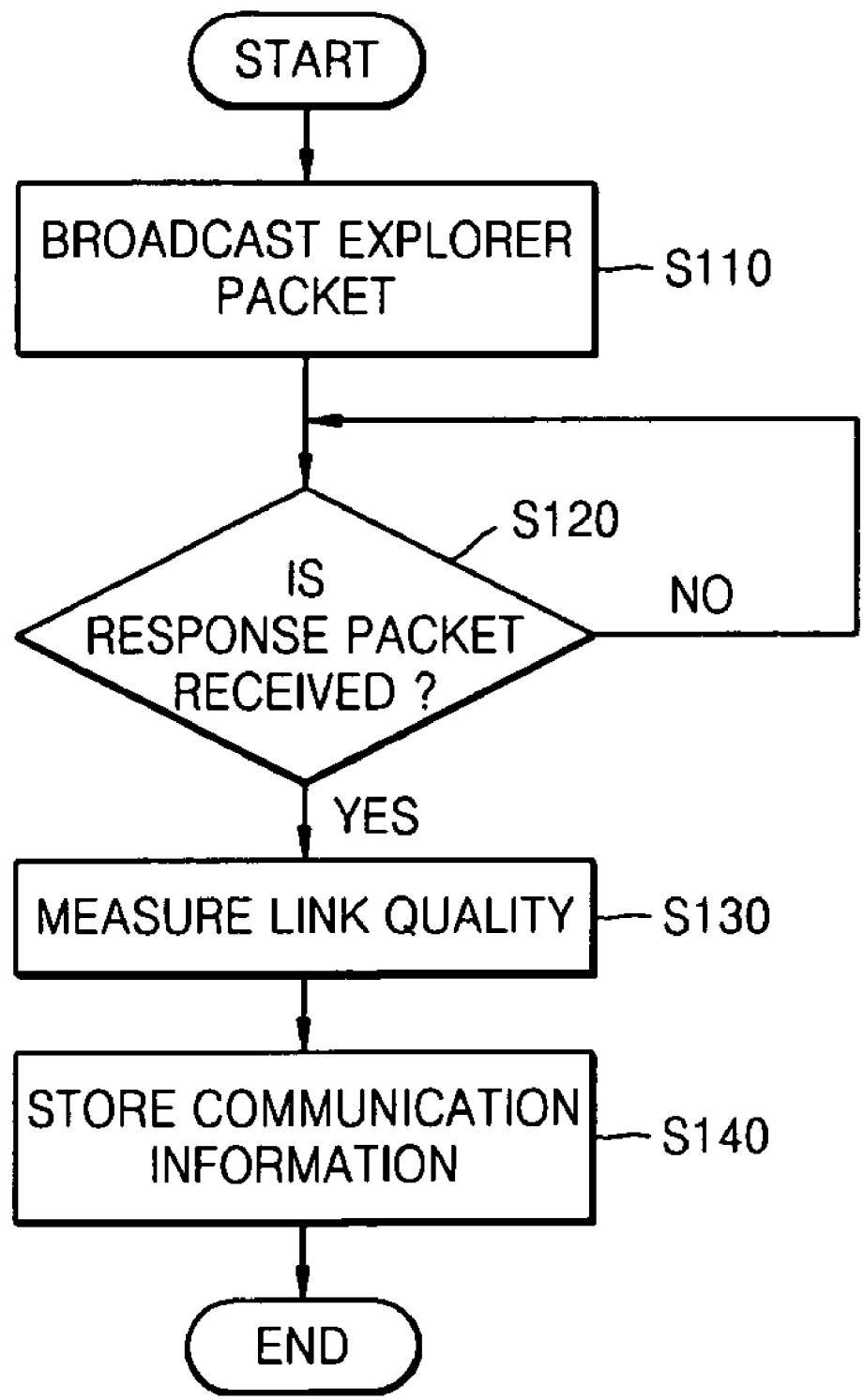
FIG. 7 is a flowchart illustrating a communication information management process of the PLC apparatus of FIG. 5, according to an embodiment of the present general inventive concept.

FIG. 7 is a flowchart illustrating a communication information management process of the PLC apparatus 100 of FIG. 5, according to an embodiment of the present general inventive concept.

The PLC module 130 broadcasts an explorer packet through the power line 10 (see FIG. 2) in operation S110. The explorer packet may include the address of the PLC apparatus 100 that transmits the explorer packet as a source address, a broadcasting address as a destination address, and identification information to identify the explorer packet.

In operation S120, it is determined whether the PLC module 130 receives a response packet in response to the broadcast explorer packet. If the PLC module 130 does not receive a response packet, the process illustrated in FIG. 7 does not proceed until the PLC module 130 receives a response packet. If the PLC module 130 receives a response packet in response to the explorer packet in operation S120, the link quality measuring module 110 measures a link quality of the PLC apparatus 100 and a second PLC apparatus that sends the response packet to the PLC apparatus 100 in response to the explorer packet using the received response packet in operation S130. The link quality may be expressed using, for example, an SNR or an amount of jitter, as mentioned above.

In operation S140 the communication information managing module 120 stores an address of the second PLC apparatus that transmits the response packet or the address of the repeater 500 and also stores communication information including the link quality measured by the link quality measuring module 110 using the response packet.

The communication information managing process may be performed periodically and the PLC apparatus 100 may manage the latest communication information (i.e., most recent communication information) regarding other PLC apparatuses present in a PLC network.

Figure 8:
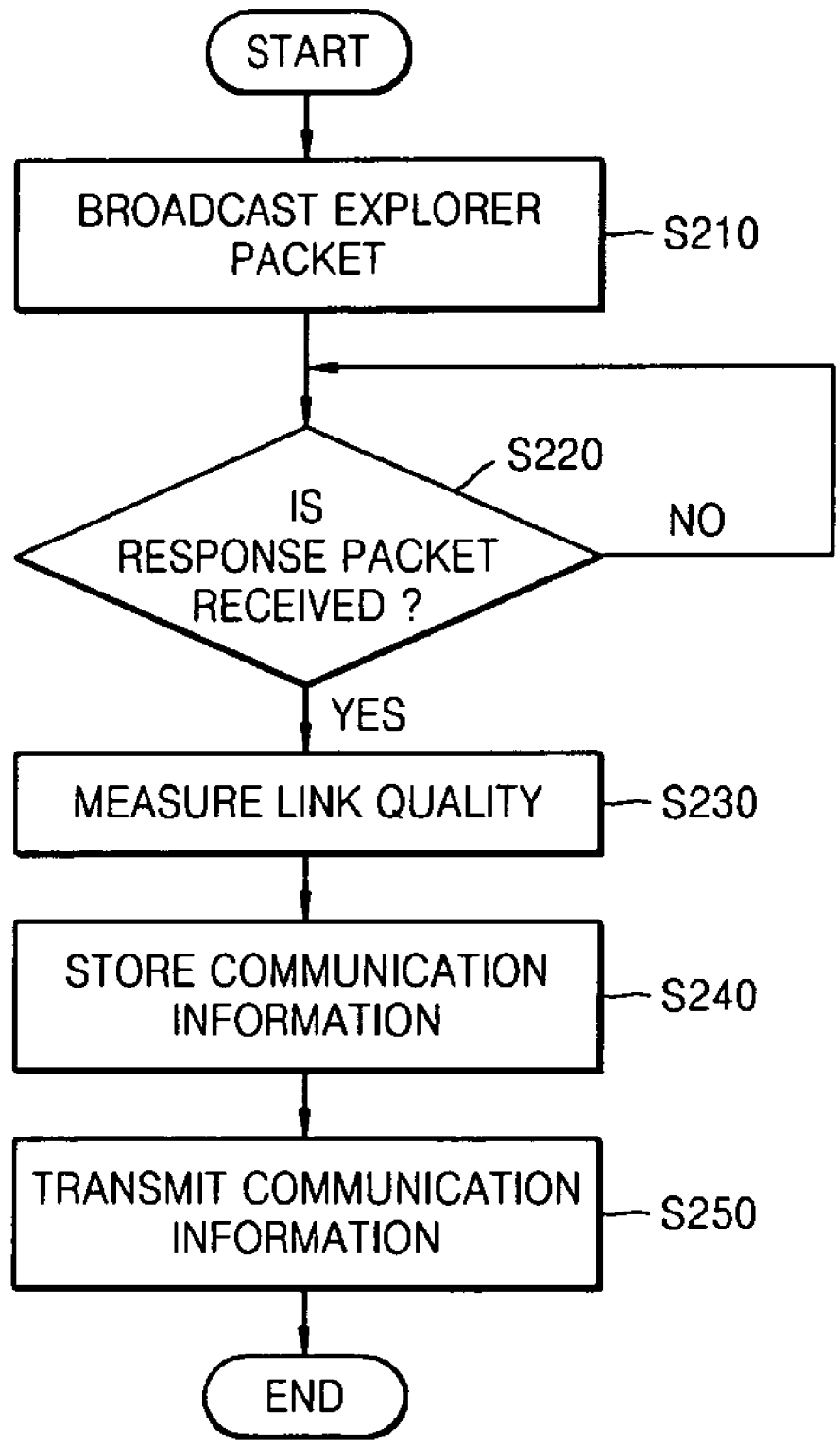
FIG. 8 is a flowchart illustrating a communication information management process of the repeater of FIG. 6, according to an embodiment of the present general inventive concept.

FIG. 8 is a flowchart illustrating a communication information management process of the repeater 500 illustrated in FIG. 6, according to an embodiment of the present general inventive concept.

The PLC module 530 broadcasts an explorer packet through the power line 10 (see FIG. 2) in operation S210. At this time, the explorer packet may have a similar structure to that broadcasted by the PLC apparatus 100, as described above.

In operation S220, it is determined whether the PLC module 530 receives a response packet in response to the broadcast explorer packet. If the PLC module 530 does not receive a response packet, the process illustrated in FIG. 8 does not proceed until the PLC module 530 receives a response packet. If the PLC module 530 receives a response packet in response to the explorer packet in operation S220, the link quality measuring module 510 measures a link quality of the PLC apparatus 100 and a second PLC apparatus that sends the response packet to the PLC apparatus 100 in response to the explorer packet using the received response packet in operation S230. The link quality may be expressed using, for example, an SNR or an amount of jitter, as mentioned above.

In operation S240 the communication information managing module 520 stores communication information, including an address of the second PLC apparatus that transmits the response packet and the link quality measured by the link quality measuring module 510, using the response packet.

The PLC module 530 then transmits the communication information stored by the communication information managing module 520 to the PLC apparatuses 100, 200, 300, and 400 in operation S250.

The communication information managing process may be performed periodically and the repeater 500 may manage the latest communication information (i.e., the most recent communication information) regarding PLC apparatuses present in a PLC network. The PLC apparatuses 100, 200, 300, and 400 present in the PLC network can determine the communication information managed by the repeater 500.

Figure 9:
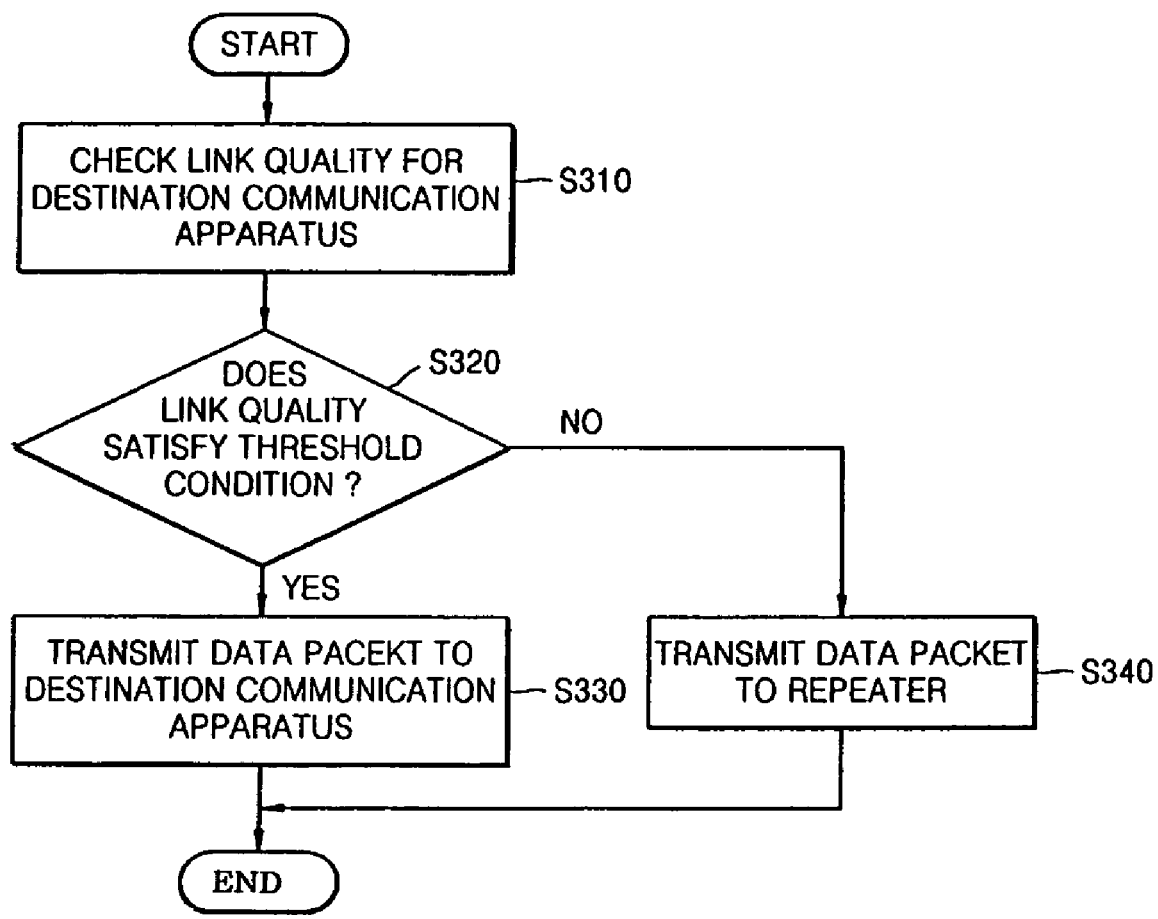
FIG. 9 is a flowchart illustrating a PLC method, according to an embodiment of the present general inventive concept.

FIG. 9 is a flowchart illustrating a PLC method, according to an embodiment of the present general inventive concept. For example, the PLC apparatus 100 of FIG. 5 that transmits a data packet may perform the operations of the PLC method of FIG. 9. Thus, the present embodiment will be described with reference the PLC apparatus 100 of FIG. 5, although the present embodiment is not limited to the PLC apparatus 100 of FIG. 5.

First, in operation S310 the control module 140 checks a link quality of a destination PLC apparatus (i.e., a PLC apparatus to receive the data packet) using communication information stored in the communication information managing module 120. In operation S320, the control module 140 determines whether the checked link quality satisfies a threshold condition. In this case, the determination of whether the checked link quality satisfies a threshold condition may vary with a method of expressing the link quality. For example, if an SNR is used to express the link quality, the control module 140 may determine that the checked link quality satisfies the threshold condition when the SNR is greater than a threshold value. As another example, if an amount of jitter is used to express the link quality, the control module 140 may determine that checked link quality satisfies the threshold condition when the amount of jitter is less than a threshold value.

If the control module 140 determines that checked link quality of the destination PLC apparatus satisfies the threshold condition, the PLC module 130 transmits the data packet to the destination PLC apparatus in operation S330. For example, when the data packet structure as illustrated in FIG. 3 is used, the PLC module 130 may generate a data packet having the source address field 612 in which the address of the PLC apparatus 100 is set, the destination address field 614 in which the address of the destination PLC apparatus is set, and the final destination address field 616 in which null is set, and may output the generated data packet to the power line 10 (see FIG. 2). When the data packet structure as illustrated in FIG. 4 is used, the PLC module 130 may generate a data packet having the source address field 612 in which the address of the PLC apparatus 100 is set, the destination address field 614 in which the address of the final PLC apparatus 100 is set, and the repeater mode field 716 in which a deactivation value is set, and may output the generated data packet to the power line 10 (see FIG. 2).

However, if the control module 140 determines that the link quality of the destination PLC apparatus does not satisfy the threshold condition, the PLC module 130 transmits the data packet destined to the destination PLC apparatus to the repeater 500 in operation S340. For example, if the data packet structure as illustrated in FIG. 3 is used, the PLC module 130 may generate a data packet having the source address field 612 in which the address of the PLC apparatus 100 is set, the destination address field 614 in which the address of the repeater 500 is set, and the final destination address field 616 in which the address of the destination PLC apparatus is set, and may output the generated data packet to the power line 10 (see FIG. 2). If the data packet structure as illustrated in FIG. 4 is used, the PLC module 130 may generate a data packet having the source address field 612 in which the address of the PLC apparatus 100 is set, the destination address field 614 in which the address of the repeater 500 is set, and the repeater mode field 716 in which an activation value is set, and may output the generated data packet to the power line 10 (see FIG. 2).

Figure 10:
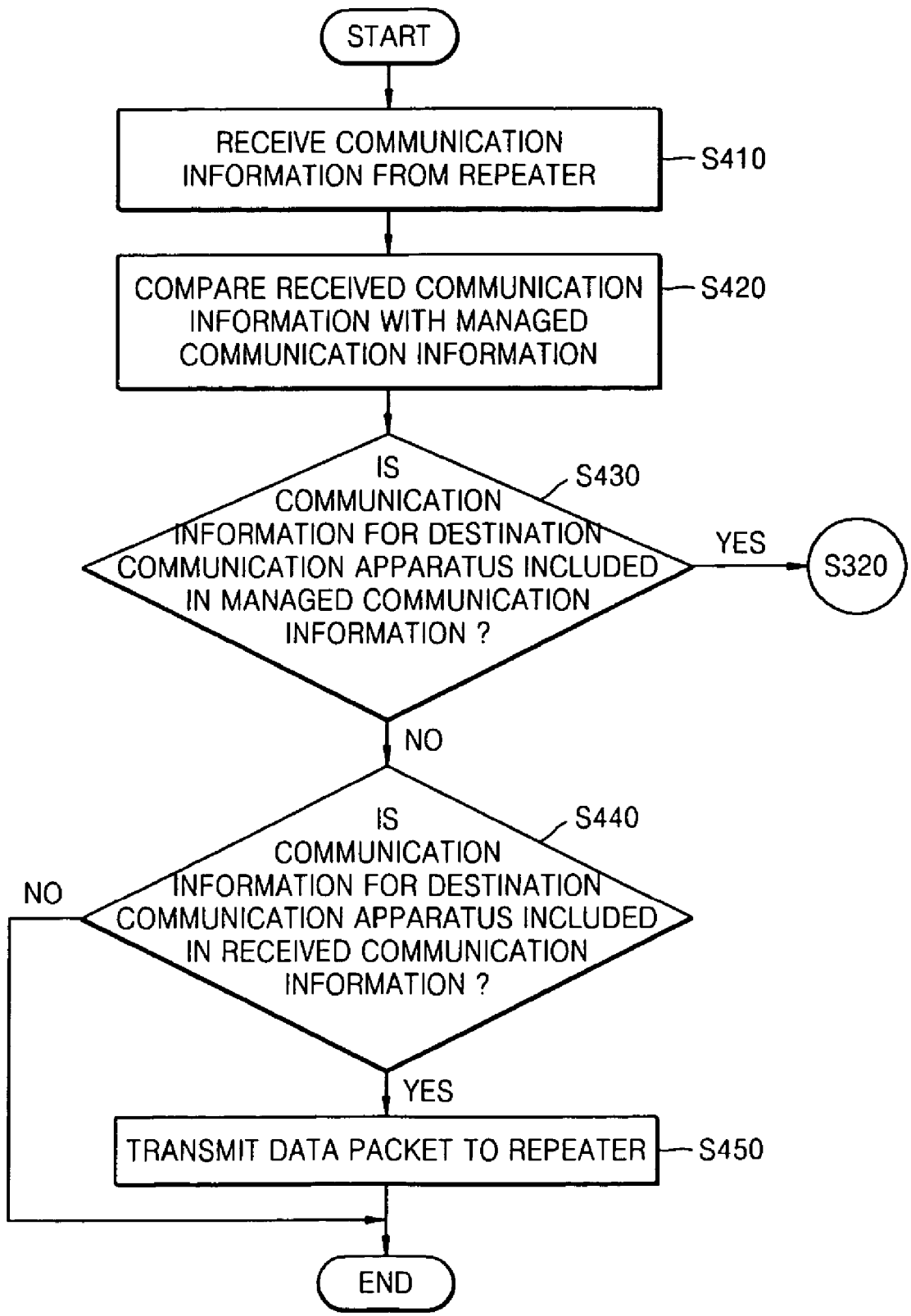
FIG. 10 is a flowchart illustrating a PLC method, according to another embodiment of the present general inventive concept.

FIG. 10 is a flowchart illustrating a PLC method according to another embodiment of the present general inventive concept. For example, the PLC apparatus 100 of FIG. 5 that transmits a data packet may perform the operations of the PLC method of FIG. 10. Thus, the present embodiment will be described with reference the PLC apparatus 100 of FIG. 5, although the present embodiment is not limited to the PLC apparatus 100 of FIG. 5.

After the repeater 500 operates as described with reference to the communication information management process illustrated in FIG. 8, the PLC module 130 can receive the communication information managed by the repeater 500 from the repeater 500 in operation S410. At this time, the communication information managing module 120 may store the received communication information.

If a data packet is to be transmitted to another PLC apparatus (i.e., the destination PLC apparatus), the control module 140 compares the received communication information received from the repeater 500 with the communication information managed by the communication information managing module 120 in operation S420. The control module 140 then determines whether the communication information managed by the communication information managing module 120 includes information about the destination PLC apparatus in operation S430.

If the communication information managed by the communication information managing module 120 includes the information about the destination PLC apparatus, the process proceeds to operation S320 of FIG. 9.

However, if the communication information managed by the communication information managing module 120 does not include the information about the destination PLC apparatus, the control module 140 determines, in operation S440, whether the communication information received from the repeater 500 includes the information about the destination PLC apparatus.

If the received communication information does not include the information about the destination PLC apparatus, the method illustrated in FIG. 10 ends. If the received communication information includes the information about the destination PLC apparatus, the PLC module 130 transmits a data packet destined to the destination PLC apparatus to the repeater 500 in operation S450.

If the data packet destined to the destination PLC apparatus is transmitted to the repeater 500 during operation S340 of FIG. 9 or operation S450 of FIG. 10, the repeater 500 operates as in FIG. 11, discussed below.

Figure 11:
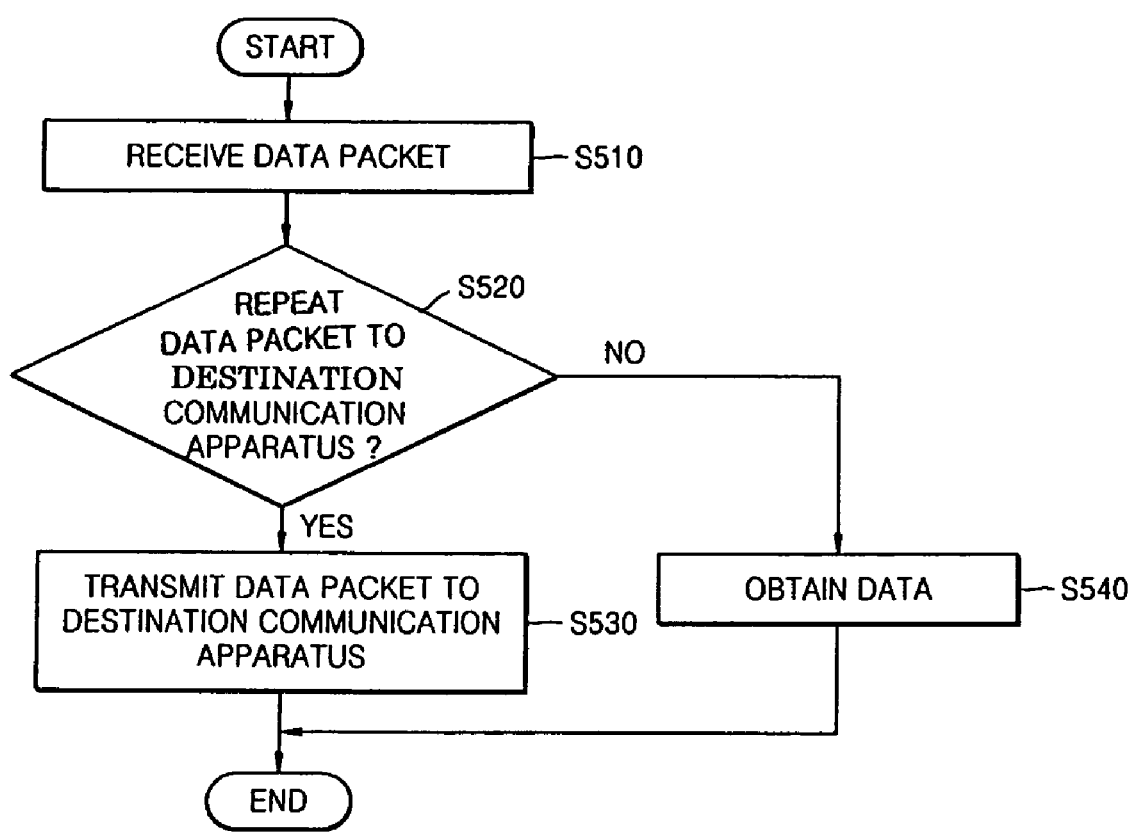
FIG. 11 is a flowchart illustrating a PLC method of a repeater, according to an embodiment of the present general inventive concept.

FIG. 11 is a flowchart illustrating a PLC method of a repeater, according to an embodiment of the present general inventive concept. For example, the repeater 500 of FIG. 6 may perform the operations of the PLC method of FIG. 11. Thus, the present embodiment will be described with reference the repeater 500 of FIG. 6, although the present embodiment is not limited to the repeater 500 of FIG. 6.

If the PLC module 530 of the repeater 500 receives a data packet from the PLC apparatus 100 in operation S510, the control module 540 determines whether to repeat the received data packet to the destination PLC apparatus in operation S520. For example, if the data packet structure as illustrated in FIG. 3 is used, the control module 520 determines to repeat the received data packet to the destination PLC apparatus when the data packet has the destination address field 614 in which the address of the repeater 500 is set and the final destination address field 616 in which the address of the destination PLC apparatus is set. If the data packet structure as illustrated in FIG. 4 is used, the control module 520 determines that the received data packet should be repeated to the destination PLC apparatus when the data packet has the repeater mode field 716 in which an activation value is set and the final destination address field 728 of a frame body in which the address of the destination PLC apparatus is set.

If the control module 520 determines that the received data packet should be repeated to the destination PLC apparatus in operation S520, the PLC module 530 transmits the received data packet to the destination PLC apparatus in operation S530. For example, if the data packet structure as illustrated in FIG. 3 is used, the PLC module 530 may reset an address set in the final destination address field 616 in the destination address field 614 and set the final destination address field 616 to null in the received data packet, and then output the data packet to the power line 10 (see FIG. 2). If the data packet structure as illustrated in FIG. 4 is used, the PLC module 530 may set the address of the repeater 500 in the source address field 712, set a value of the final destination address field 728 in the destination address field 714, set an activation value in the repeater mode field 716 in the received data packet, and then output the data packet to the power line 10 (see FIG. 2).

If the control module 520 determines that the received data packet should not be repeated to the destination PLC apparatus in operation S520, the control module 540 may obtain data included in the received data packet in operation S540.

The PLC apparatus 100 joins a PLC cell and performs a PLC method using the repeater 500 and the coordinator 600 of FIG. 2 as follows. In the following description, PLC apparatuses joining a PLC cell will be referred to as stations.

A station joining a cell receives a beacon message from the coordinator 600 (see FIG. 2). The beacon message includes scheduling information associated with medium access in a cell. The station performs a cell joining process by referring to the beacon message. The station periodically receives scheduling information in the cell through the beacon message even after joining the cell. However, a station that cannot directly receive the beacon message from the coordinator 600 (see FIG. 2) still needs to join the cell. Such a station needs to receive the beacon message in order to join the cell. To this end, the repeater repeats the beacon message between the station and the repeater.

Figure 12A:
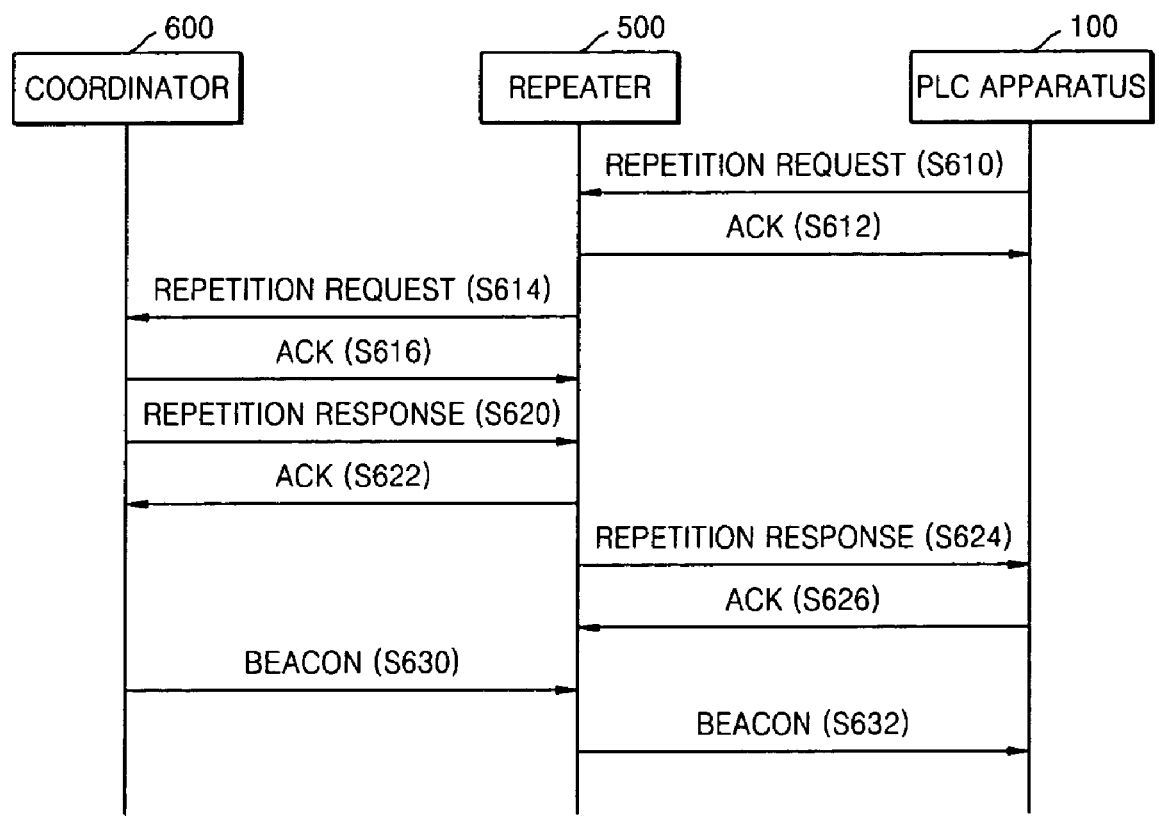
FIGS. 12A through 12C are diagrams illustrating cell joining of a PLC apparatus that cannot directly receive a beacon message, according to an embodiment of the present general inventive concept.
Figure 12B:
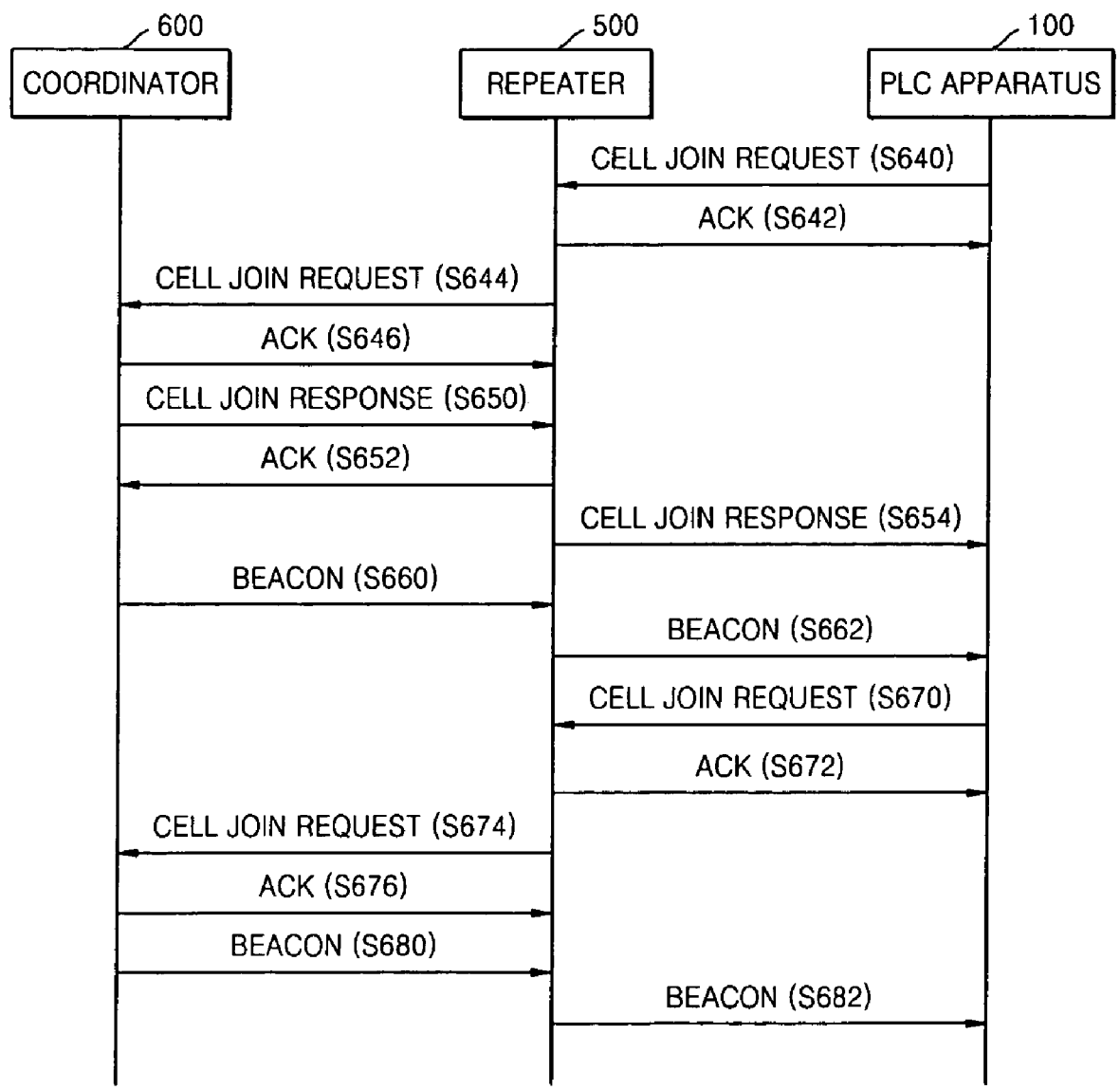
Figure 12C:
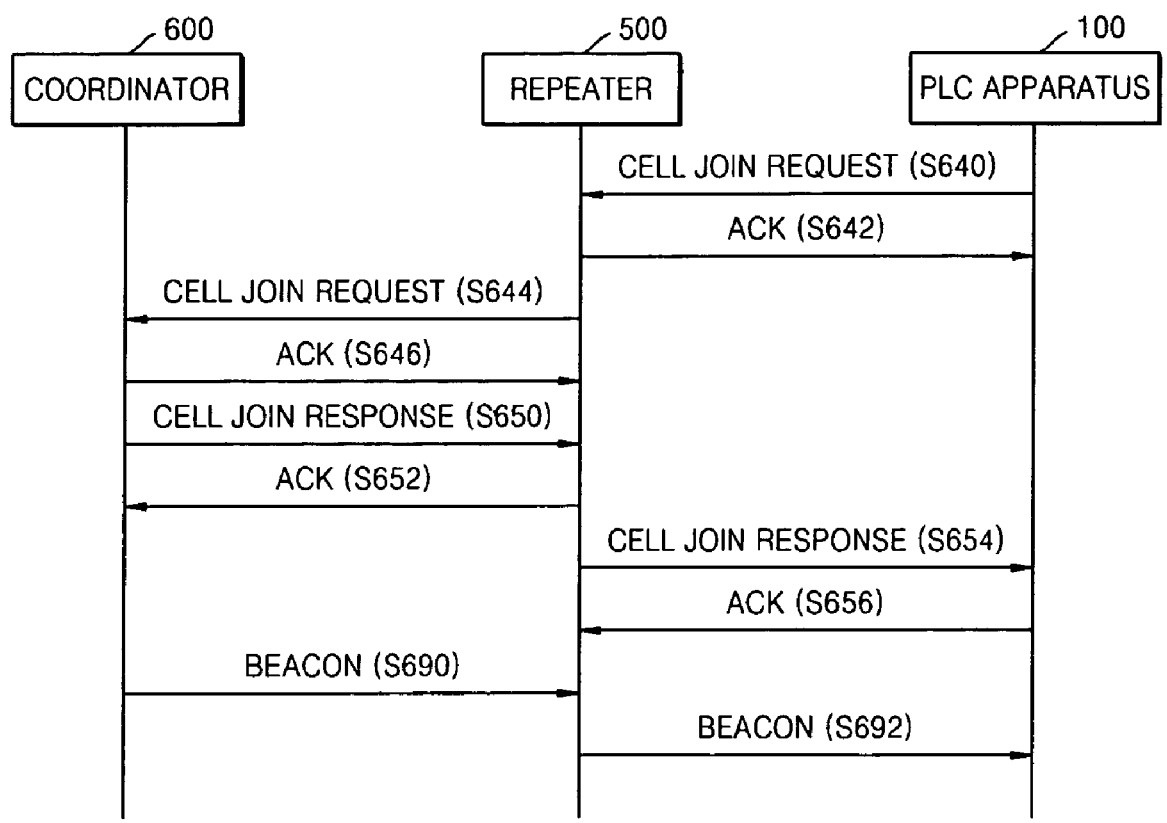

FIGS. 12A through 12C are diagrams illustrating cell joining of the PLC apparatus 100 that cannot directly receive the beacon message in the cell from a coordinator (such as the coordinator 600 of FIG. 2), according to an embodiment of the present general inventive concept.

The PLC apparatus 100 that cannot directly receive the beacon message from the coordinator 600 receives the beacon message indirectly from the coordinator 600 via the repeater 500 to join the cell. FIG. 12A is a diagram illustrating a process in which the PLC apparatus 100 sends a repetition request to the repeater 500 and receives a response to receive the beacon message.

The PLC apparatus 100 sends the repetition request message to the repeater 500 in operation S610. The repetition request message includes a destination station ID field, a source station ID field, and a repeater mode. The PLC apparatus 100 sets the address of the repeater 500 in the destination station ID field and sets "UnjoinedID" in the source station ID field, thereby expressing that the PLC apparatus 100 does has not yet joined the cell. The PLC apparatus 100 also sets the repeater mode to "Enable" to indicate that the repeater 500 is not the final receiver. The PLC apparatus 100 carries information about a source, a repeater, and a target on a command frame body of a message packet.

Upon receipt of the repetition request message, the repeater 500 transmits an acknowledgment (ACK) message in response to the repetition request message to the PLC apparatus 100 in operation S612. Such an ACK message to acknowledge the receipt of the repetition request message is known to those skilled in the art and thus will not be described.

The repeater 500 transmits the repetition request message to the coordinator 600 in operation S614. Upon receipt of the repetition request message, the coordinator 600 transmits an acknowledgment (ACK) message in response to the repetition request message to the repeater 500 in operation S616. At this time, the repeater 500 sets the address of the coordinator 600 in the destination station ID field and sets the address of the repeater 500 in the source station ID field. The contents of the repetition request message to be transmitted are the same as those of the repetition request message received from the PLC apparatus 100.

The coordinator 600 transmits a repetition response message in response to the repetition request message to the repeater 500 in operation S620. Upon receipt of the repetition response message, the repeater 500 transmits an acknowledgment (ACK) message in response to the repetition response message to the coordinator 600 in operation S622. At this time, the coordinator 600 sets the address of the repeater 500 in the destination ID field and the address of the coordinator 600 in the source station ID field. The coordinator 600 also sets the repeater mode to "Enable" to indicate that the repeater 500 is not a final receiver. The coordinator 600 carries information about a source, a repeater, and a target on a command frame body of a message packet.

The repeater 500 transmits the repetition response message received from the coordinator 600 to the PLC apparatus 100 in operation S624. Upon receipt of the repetition response message, the PLC apparatus 100 transmits an acknowledgment (ACK) message in response to the repetition response message to the repeater 500 in operation S624. At this time, the repeater 500 sets "UnjoinedID" in the destination station ID field and the address of the repeater 500 in the source station ID field.

After completion of operations S610 through S626, the coordinator 600 sends the beacon message to the repeater 500 in operation S630, and the repeater 500 repeats the beacon message received from the coordinator 600 to the PLC apparatus 100 in operation S632.

By the process of FIG. 12A, the PLC apparatus 100 that cannot directly receive the beacon message from the coordinator 600 can receive the beacon message via the repeater 500, thereby joining the PLC apparatus 100 to the cell.

FIG. 12B is a diagram illustrating a process in which the PLC apparatus 100 capable of receiving the beacon message via the repeater 500 joins the cell.

First, the PLC apparatus 100 transmits a cell join request message to the repeater 500 in operation S640. Upon receipt of the cell join request message, the repeater 500 transmits an acknowledgment (ACK) message in response to the cell join request message to the PLC apparatus 100 in operation S642. At this time, the PLC apparatus 100 sets the address of the repeater 500 in the destination station ID field and "UnjoinedID" in the source station ID field. The PLC apparatus 100 sets the repeater mode to "Enable" and carries information about a source, a repeater, and a target on a command frame body of a message packet.

The repeater 500 repeats the cell join request message to the coordinator 600 in operation S644. Upon receipt of the cell join request message, the coordinator 600 transmits an acknowledgment (ACK) message in response to the cell join request message to the repeater 500 in operation S644. At this time, the repeater 500 sets the address of the coordinator 600 in the destination station ID field and the address of the repeater 500 in the source station ID field. The contents of the cell join request message to be transmitted are the same as those of the cell join request message received from the PLC apparatus 100.

The coordinator 600 receiving the cell join request message checks scheduling information and transmits a cell join response message including information required for cell joining of the PLC apparatus 100 to the repeater 500 in operation S650. Upon receipt of the cell join response message, the repeater 500 transmits an acknowledgment (ACK) message in response to the cell join response message to the coordinator 600 in operation S652. At this time, the coordinator 600 sets the address of the repeater 500 in the destination ID field and the address of the coordinator 600 in the source station ID field. The coordinator 600 also sets the repeater mode to "Enable" to indicate that the repeater is not a final receiver. The coordinator 600 carries Information about a source, a repeater, and a target on a command frame body of a message packet.

The repeater 500 transmits the cell join response message received from the coordinator 600 to the PLC apparatus 100 in operation S654. At this time, the repeater 500 sets "UnjoinedID" in the destination station ID field and the address of the repeater 500 in the source station ID field. The cell join response message transmitted from the repeater 500 to the PLC apparatus 100 has an ACK policy field indicating whether to transmit an ACK message, in which "NO-ACK" is set. Thus, the PLC apparatus 100 does not transmit the ACK message with respect to the cell join response message.

The coordinator 600 transmits the beacon message to the repeater 500 in operation S660, and the beacon message is transmitted to the PLC apparatus 100 via the repeater 500 in operation S662.

The PLC apparatus 100 receiving the cell join response message transmits a second cell join request message to the repeater 500 in operation S670. Upon receipt of the second cell join request message, the repeater 500 transmits an acknowledgment (ACK) message in response to the second cell join request message to the PLC apparatus 100 in operation S672. At this time, the PLC apparatus 100 sets the address of the repeater 500 in the destination station ID field and a newly designated station ID in the source station ID field. The PLC apparatus 100 also sets the repeater mode to "Enable".

The repeater 500 repeats the second cell join request message to the coordinator 600 in operation S674. Upon receipt of the second cell join request message, the coordinator 600 transmits an acknowledgment (ACK) message in response to the second cell join request message to the repeater 500 in operation S676. At this time, the repeater 500 sets the address of the coordinator 600 in the destination station ID field and the address of the repeater 500 in the source station ID field. The contents of the second cell join request message to be transmitted are the same as those of the second cell join request message received from the PLC apparatus 100.

The coordinator 600 receiving the second cell join request message transmits information, indicating that a new station has joined a cell, to the repeater 500 by using a beacon message in operation S680. The information may include an ID, address, and state of the newly-joined station.

In operation S682 the repeater 500 transmits the received beacon message to the PLC apparatus 100 that newly joins the cell.

According to another embodiment of the present general inventive concept, the PLC apparatus 100 may join the cell as illustrated in FIG. 12C. Referring to FIG. 12C, the PLC apparatus 100 performs the same operations as those in FIG. 12B in operations S640 through S652. However, in operation S654, "Imm-ACK" is set in the ACK-policy field of the cell join response message to request an ACK message from the PLC apparatus 100. In this case, the PLC apparatus 100 checks station address information of a frame body of the cell join response message. Thus, the PLC apparatus 100 transmits the ACK message, in operation S656, only when the PLC apparatus 100 corresponds to the station address information.

In FIG. 12C, since the station address information is checked by using the ACK message in operation S656, it is not necessary to transmit the second cell join request message. Thus, the coordinator 600 then transmits information, indicating that a new station has joined a cell, to the repeater 500 through the beacon message in operation S690, and the repeater 500 transmits the received beacon message in operation S692 to the PLC 100 that newly joins the cell.

Figure 13:
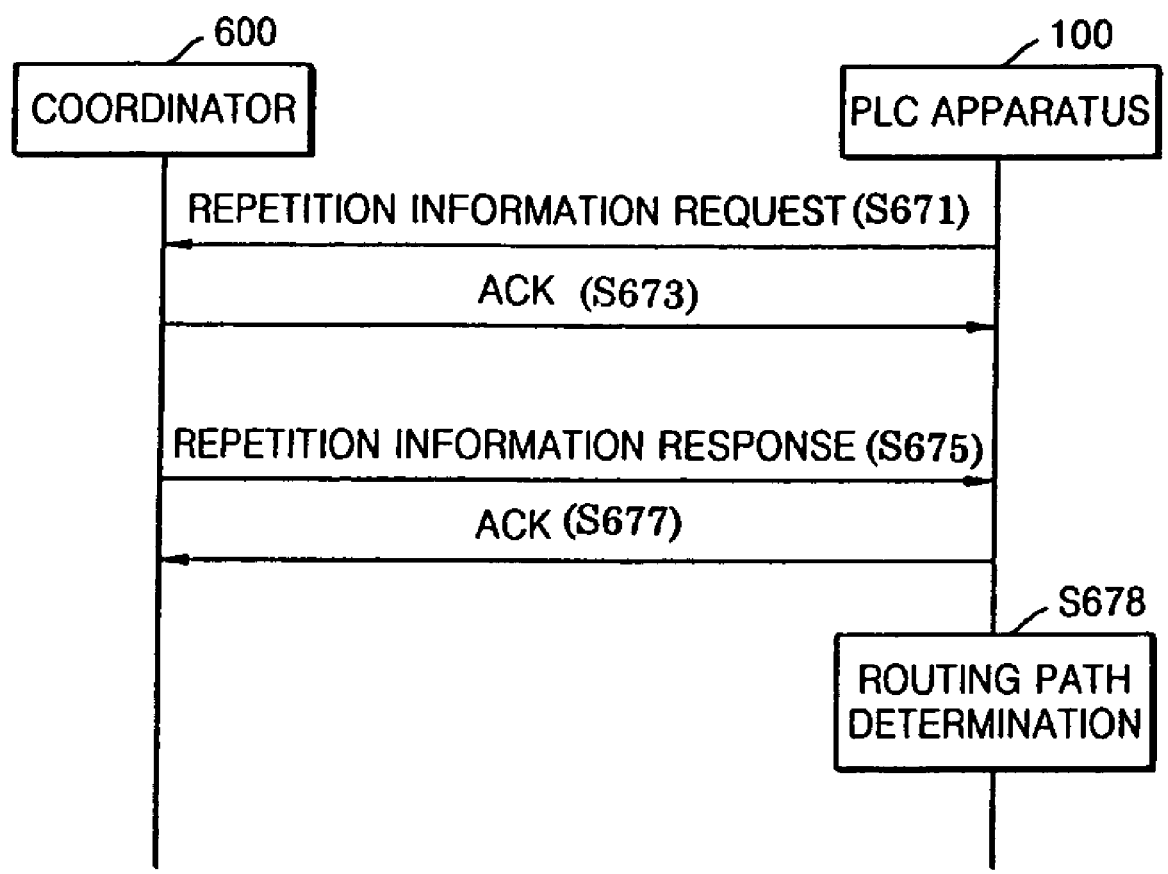
FIG. 13 is a diagram illustrating a process in which a PLC apparatus receives repeating information from a coordinator to determine an optimal repeating route, according to an embodiment of the present general inventive concept.

FIG. 13 is a diagram illustrating a process in which the PLC apparatus 100 receives repetition information from the coordinator 600 to determine the optimal routing path, according to an embodiment of the present general inventive concept. The optimal routing path refers to a path along which data can be most efficiently transmitted to a final destination PLC apparatus. The determination of the optimal routing path includes a determination of a repeater to transmit a message.

FIG. 13 illustrates a case where the PLC apparatus 100 communicates with the coordinator 600 via the repeater 500 and a case where the PLC apparatus 100 communicates directly with the coordinator 600. However, with respect to the case where the PLC apparatus 100 communicates with the coordinator 600 via the repeater 500, a message repeating process of the repeater 500 between the coordinator 600 and the PLC apparatus 100 (see, for example, FIG. 12A) is omitted in FIG. 13.

If the PLC apparatus 100 transmits a repetition information request message to the coordinator 600 in operation S671, either directly or via the repeater 500, the coordinator 600 transmits a repetition information response message including repetition information to the PLC apparatus 100 in operation S675. Upon receipt of the repetition information request message, the coordinator 600 transmits an acknowledgment (ACK) message in response to the repetition information request message to the PLC apparatus 100 in operation S673. Similarly, upon receipt of the repetition information response message, the PLC apparatus 100 transmits an acknowledgment (ACK) message in response to the repetition information response message to the coordinator 600 in operation S677.

As discussed above, FIG. 13 illustrates the case where the PLC apparatus 100 communicates with the coordinator 600 via the repeater 500 and the case where the PLC apparatus 100 communicates directly with the coordinator 600, although the case where the PLC apparatus 100 communicates with the coordinator 600 via the repeater 500 is omitted in FIG. 13. Thus, although not illustrated in FIG. 13, in the case where the PLC apparatus 100 communicates with the coordinator 600 via the repeater 500, operations S671 and S673 of FIG. 13 may include operations similar to operations S610-S616 of FIG. 12A, and operations S675 and S677 of FIG. 13 may include operations similar to operations S620-S626 of FIG. 12A.

The PLC apparatus 100 determines the optimal routing path to a final destination station using the received repetition information in operation S678.

Figure 14:
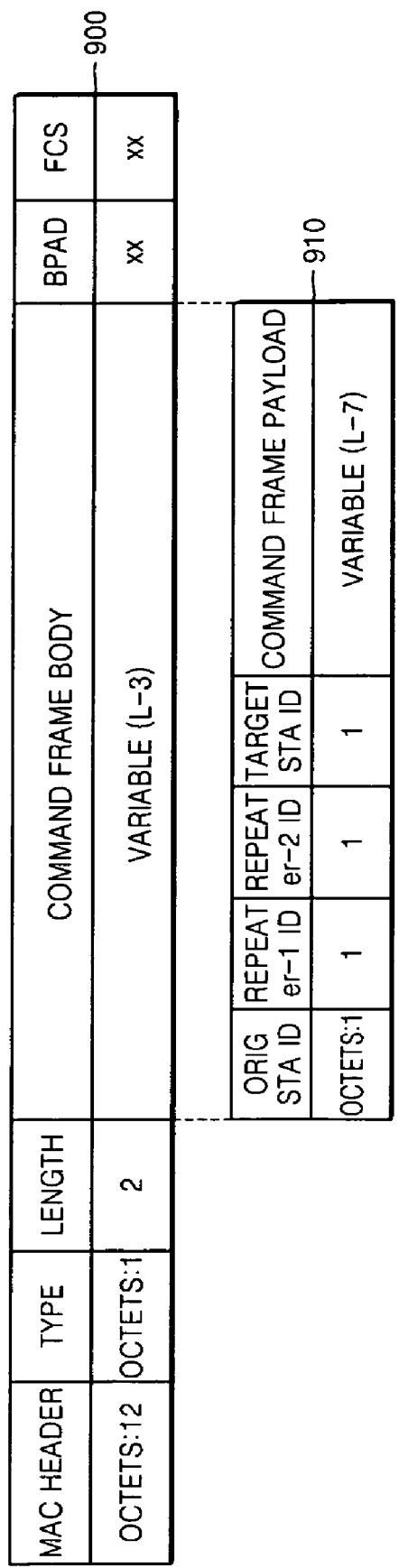
FIG. 14 is a view illustrating a frame structure of a repetition information response message, according to an embodiment of the present general inventive concept.

FIG. 14 illustrates a frame structure of a repetition information response message 900, according to an embodiment of the present general inventive concept. Referring to FIG. 14, the repetition information response message 900 includes a medium access control (MAC) header of 12 octets, a type field of 1 octet, a length field of 2 octets, a variable command frame body 910, a Block Padding (BPAD) field, and a Frame Check Sequence (FCS) field.

The command frame body 910 includes an origin station ID field, at least one repeater field (such as a repeat er-1 ID field and a repeat er-2 ID field), a target station ID field, and a command frame payload.

Although two repeater fields are illustrated in FIG. 14, a form of a frame may be changed to increase a number of repeater fields if more than two repeaters are used.

To generate the repetition information, the coordinator 600 requires information about whether a repeater is used to repeat data of PLC apparatuses, about a number of PLC apparatuses using the repeater, and/or about a load on the repeater. Such information of the PLC apparatuses is referred to as station information.

Figure 15:
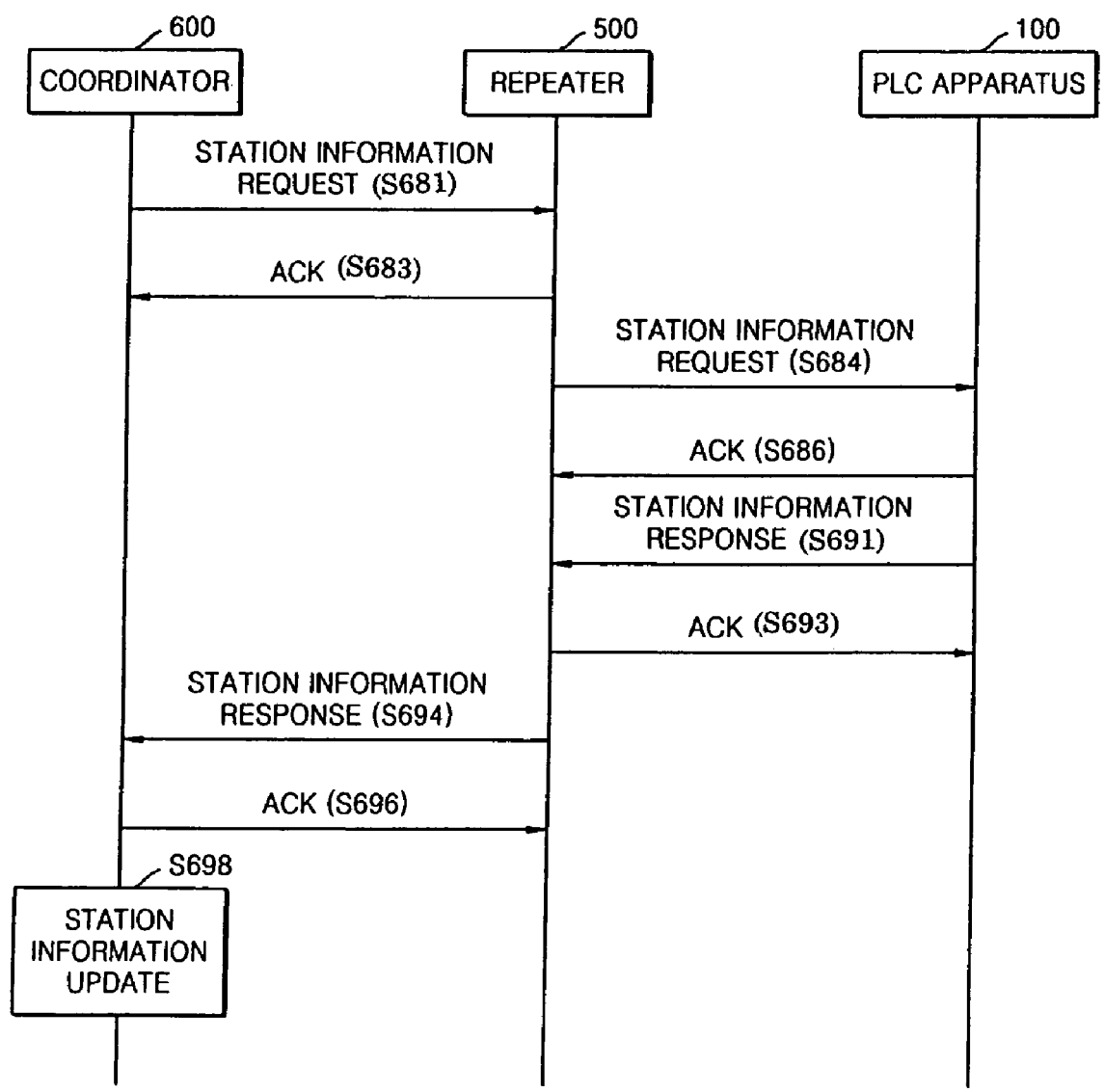
FIG. 15 is a diagram illustrating a process in which a coordinator obtains station information from a PLC apparatus via a repeater, according to an embodiment of the present general inventive concept.

FIG. 15 is a diagram illustrating a process in which the coordinator 600 obtains station information from the PLC apparatus 100 via the repeater 500, according to an embodiment of the present general inventive concept.

First, the coordinator 600 transmits a station information request message to the repeater 500 in operation S681. Upon receipt of the station information request message, the repeater 500 transmits an acknowledgment (ACK) message in response to the station information request message to the coordinator 600 in operation S683. At this time, the coordinator 600 sets the ID of the repeater 500 in the destination station ID field, the ID of the coordinator 600 in the source station ID field, and the repeater mode to "Enable". The coordinator 600 carries information about a source, a repeater, and a target on a command frame body of a message packet.

The repeater 500 transmits the station information request message to the PLC apparatus 100 in operation S684. Upon receipt of the station information request message, the PLC apparatus 100 transmits an acknowledgment (ACK) message in response to the station information request message to the repeater 500 in operation S686. At this time, the repeater 500 sets the ID of the PLC apparatus 100 in the destination station ID field and the ID of the repeater 500 in the source station ID field.

The PLC apparatus 100 transmits a station information response message including station information to the repeater 500 in operation S691. Upon receipt of the station information response message, the repeater 500 transmits an acknowledgment (ACK) message in response to the station information response message to the PLC apparatus 100 in operation S693. At this time, the PLC apparatus 100 sets the ID of the repeater 500 in the destination station ID field, the ID of the PLC apparatus 100 in the source station ID field, and the repeater mode to "Enable".

The repeater 500 transmits the station information response message to the coordinator 600 in operation S694. Upon receipt of the station information response message, the coordinator 600 transmits an acknowledgment (ACK) message in response to the station information response message to the repeater 500 in operation S696. At this time, the repeater 500 sets the ID of the coordinator 600 in the destination station ID field and the ID of the repeater 500 in the source station ID field.

The coordinator 600 receiving the station information checks if station information responses are received from all stations that join in the cell, and updates station information stored in the coordinator 600 using the received station information, in operation S698.

Figure 16:
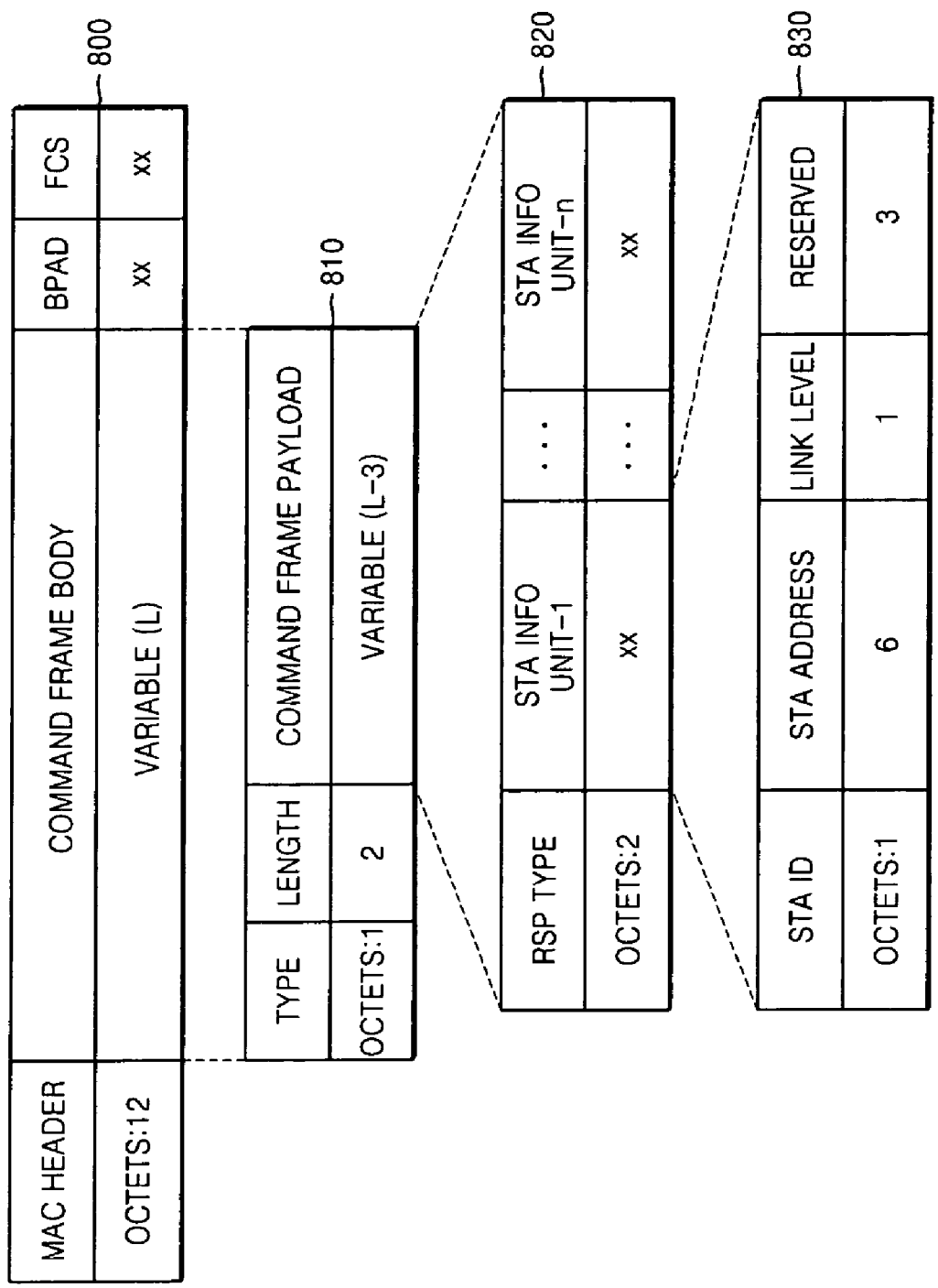
FIG. 16 is a view illustrating a frame structure of a station information response message, according to an embodiment of the present general inventive concept.

FIG. 16 illustrates a frame structure of a station information response message 800, according to an embodiment of the present general inventive concept.

Referring to FIG. 16, the station information response message 800 includes an MAC header of 12 octets, a variable command frame body 810, a Block Padding (BPAD) field, and an FCS field.

The variable command frame body 810 may include a type field of 1 octet, a length field of 2 octets, and a variable command frame payload 820.

The command frame payload 820 may include a response (rsp) type field of 2 octets and one or more station information (sta info unit-1 through sta info unit-n) fields of one or more stations. In FIG. 16, the command frame payload 820 includes a response (rsp) type field and station information fields for n stations.

A station information field 830 may include station information for each station. A STA ID field indicates an ID of a station of 1 octet. A STA address field indicates an address of a station (such as the STA address ID field having a value of 6 in FIG. 16).

In a link level field, information about a number of bits that can be transmitted between a station and another reachable station is expressed by an appropriate level. The number of bits that can be transmitted is obtained by channel estimation. A value of the link level field (such as value 1 illustrated in FIG. 16) indicates a degree of linkage between two specific stations.

The coordinator 600 receives station information from all of the stations and determines a degree of a linkage between all of the stations. Thus, the coordinator 600 can determine an optimal routing path between two stations using the determined degree of linkage between the two stations.

The station information field 830 may also include a reserved field that can be used for a variety of purposes, and may include a reserved field value (such as a value 3 illustrated in FIG. 16).

According to the present general inventive concept, a station (PLC apparatus) can intelligently and automatically set an optimal routing path by determining whether to use a repeater and by selecting the repeater to communicate with another station (another PLC apparatus), without a need for a user's direct setting, thereby selectively using the repeater, maintaining a quality of service (QoS), and providing a convenience to users.

The present general inventive concept can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (e.g., transmission over the Internet). The computer-readable recording medium can also be distributed over network coupled computer systems so that the computer-readable code is stored and executed in a distributed fashion.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A power line communication method, comprising:
   determining whether a destination communication apparatus to receive a data packet can directly communicate without using a repeater;
   transmitting the data packet to the destination communication apparatus when it is determined that the destination communication apparatus can directly communicate without using the repeater; and
   transmitting the data packet to the repeater when it is determined that the destination communication apparatus cannot directly communicate without using the repeater,
   wherein the determining of whether the destination communication apparatus can directly communicate comprises:
   determining that the destination communication apparatus can directly communicate without using the repeater when a beacon message is received by the destination communication apparatus from a coordinator of a PLC cell including the destination communication apparatus; and
   determining that the destination communication apparatus cannot directly communicate without using the repeater when the beacon message is not received by the destination communication apparatus from the coordinator of the PLC cell including the destination communication apparatus.

2. The power line communication method of claim 1, further comprising:
   joining the destination communication apparatus to the PLC cell using PLC cell scheduling information included in the beacon message when the beacon message is received by the destination communication apparatus.

3. The power line communication method of claim 1, further comprising:
   joining the destination communication apparatus to the PLC cell using the repeater when the beacon message is not received by the destination communication apparatus.

4. The power line communication method of claim 3, wherein the joining of the destination communication apparatus to the PLC cell using the repeater comprises:
   transmitting a cell join request message with respect to the PLC cell to the repeater; and
   receiving a cell join permit message with respect to the PLC cell from the repeater.

5. The power line communication method of claim 4, wherein:
   the transmitting of the cell join request message comprises transmitting the cell join request message to the coordinator via the repeater; and
   the receiving of the cell join permit message comprises receiving the cell join permit message by the repeater from the coordinator.

6. The power line communication method of claim 4, wherein the joining of the destination communication apparatus to the PLC cell using the repeater further comprises:
   transmitting a repetition request message to the repeater;
   receiving a repetition response message from the repeater; and
   receiving the beacon message from the coordinator via the repeater.

7. The power line communication method of claim 3, further comprising:
   transmitting a request for repetition information to the coordinator via the repeater;
   receiving a message including the repetition information from the coordinator via the repeater; and
   determining an optimal routing path to the destination communication apparatus using the repetition information.

8. The power line communication method of claim 7, wherein the repetition information comprises information about one or more communication apparatuses repeated by one or more repeaters joining the PLC cell.

9. The power line communication method of claim 3, further comprising:
   receiving a station information request message from the coordinator via the repeater; and
   transmitting a message including station information to the coordinator via the repeater.

10. A power line communication method, comprising:
    determining whether a destination communication apparatus to receive a data packet can directly communicate without using a repeater;
    transmitting the data packet to the destination communication apparatus when it is determined that the destination communication apparatus can directly communicate without using the repeater; and
    transmitting the data packet to the repeater when it is determined that the destination communication apparatus cannot directly communicate without using the repeater,
    wherein the determining of whether the destination communication apparatus can directly communicate without using a repeater comprises:
    measuring a link quality of the destination communication apparatus;
    determining that the destination communication apparatus can directly communicate without using the repeater when the measured link quality satisfies a threshold condition; and
    determining that the destination communication apparatus cannot directly communicate without using the repeater when the measured link quality does not satisfy the threshold condition,
    wherein the measuring of the link quality of the destination communication apparatus comprises:
    broadcasting an explorer packet to a PLC network;
    receiving a response packet in response to the broadcast explorer packet; and
    measuring the link quality using the response packet.

11. A power line communication method, comprising:
    determining whether a destination communication apparatus to receive a data packet can directly communicate without using a repeater;
    transmitting the data packet to the destination communication apparatus when it is determined that the destination communication apparatus can directly communicate without using the repeater; and
    transmitting the data packet to the repeater when it is determined that the destination communication apparatus cannot directly communicate without using the repeater,
    wherein the determining of whether the destination communication apparatus can directly communicate without using a repeater comprises:
    measuring a link quality of the destination communication apparatus;

determining that the destination communication apparatus can directly communicate without using the repeater when the measured link quality satisfies a threshold condition; and determining that the destination communication apparatus cannot directly communicate without using the repeater when the measured link quality does not satisfy the threshold condition, the method further comprising:

receiving communication information including addresses of communication apparatuses in the PLC network and link qualities between each of the communication apparatuses in the PLC network and the repeater from the repeater; and determining that the destination communication apparatus cannot directly communicate without using the repeater when the link quality for the destination communication apparatus is not measured, but is included in the received communication information.

12. A power line communication apparatus, comprising:
a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater.

13. A power line communication apparatus, comprising:
a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater; and
a cell joining unit to join the destination communication apparatus to the PLC cell using the repeater when the beacon message is not received by the beacon receiving unit.

14. A power line communication apparatus, comprising:
a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater; and
a cell joining unit to join the destination communication apparatus to the PLC cell using the repeater when the beacon message is not received by the beacon receiving unit, the cell joining unit including:
  a cell join request message transmitting unit to transmit a cell join request message of the PLC cell to the repeater; and
  a cell join permit message receiving unit to receive a cell join permit message of the PLC cell from the repeater.

15. A power line communication apparatus, comprising:
a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater; and a cell joining unit to join the destination communication apparatus to the PLC cell using the repeater when the beacon message is not received by the beacon receiving unit, the cell joining unit including:

a cell join request message transmitting unit to transmit a cell join request message of the PLC cell to the repeater, and to transmit the cell join request message to the coordinator via the repeater; and a cell join permit message receiving unit to receive a cell join permit message of the PLC cell from the repeater, and the cell join permit message to be received by the repeater from the coordinator.

16. A power line communication apparatus, comprising:

a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater; and a cell joining unit to join the destination communication apparatus to the PLC cell using the repeater when the beacon message is not received by the beacon receiving unit, the cell joining unit including:
  a cell join request message transmitting unit to transmit a cell join request message of the PLC cell to the repeater, and to transmit the cell join request message to the coordinator via the repeater, and the cell join permit message is received by the repeater from the coordinator;
  a cell join permit message receiving unit to receive a cell join permit message of the PLC cell from the repeater;
  a repetition request message transmitting unit to transmit a repetition request message to the repeater;
  a repetition response message receiving unit to receive a repetition response message from the repeater; and
  a beacon message receiving to receive the beacon message transmitted from the coordinator via the repeater.

17. A power line communication apparatus, comprising:

a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater;

a cell joining unit to join the destination communication apparatus to the PLC cell using the repeater when the beacon message is not received by the beacon receiving unit;

a repetition information requesting unit to transmit a request for repetition information to the coordinator via the repeater;

a repetition information receiving unit to receive a message including the repetition information from the coordinator via the repeater; and a routing path determining unit to determine an optimal routing path to the destination communication apparatus using the repetition information.

18. A power line communication apparatus, comprising:

a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater;

a cell joining unit to join the destination communication apparatus to the PLC cell using the repeater when the beacon message is not received by the beacon receiving unit;

a repetition information requesting unit to transmit a request for repetition information to the coordinator via the repeater, the request for repetition information including information about one or more communication apparatuses repeated by one or more repeaters joining the PLC cell;

a repetition information receiving unit to receive a message including the repetition information from the coordinator via the repeater; and a routing path determining unit to determine an optimal routing path to the destination communication apparatus using the repetition information.

19. A power line communication apparatus, comprising:
a repeater usage determining unit to determine whether a destination communication apparatus to receive a data packet can directly communicate without using a repeater, the repeater usage determining unit including:
  a beacon receiving unit to receive a beacon message transmitted by a coordinator of a PLC cell including the destination communication apparatus;
  a first determining unit to determine that the destination communication apparatus can directly communicate without using the repeater when the beacon message is received by the beacon receiving unit; and
  a second determining unit to determine that the destination communication apparatus cannot directly communicate without using the repeater when the beacon message is not received by the beacon receiving unit; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater;
a cell joining unit to join the destination communication apparatus to the PLC cell using the repeater when the beacon message is not received by the beacon receiving unit;
a station information request receiving unit to receive a station information request message from the coordinator via the repeater; and
a station information transmitting unit to transmit a message including station information to the coordinator via the repeater.

20. A power line communication apparatus, comprising:
a repeater usage determining unit to determine whether a destination communication apparatus to receive a data packet can directly communicate without using a repeater, the repeater usage determining unit including:
  a link quality measuring unit to measure a link quality of the destination communication apparatus;
  a first determining unit to determine that the destination communication apparatus can directly communicate without using the repeater when the measured link quality satisfies a threshold condition; and
  a second determining unit to determine that the destination communication apparatus cannot directly communicate without using the repeater when the measured link quality does not satisfy the threshold condition; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater;

an explorer packet transmitting unit to broadcast an explorer packet to a PLC network; and
a response packet receiving unit to receive a response packet in response to the broadcast explorer packet, the link quality measuring unit to measure the link quality using the response packet.

21. A power line communication apparatus, comprising:
a repeater usage determining unit to determine whether a destination communication apparatus to receive a data packet can directly communicate without using a repeater, the repeater usage determining unit including:
  a link quality measuring unit to measure a link quality of the destination communication apparatus;
  a first determining unit to determine that the destination communication apparatus can directly communicate without using the repeater when the measured link quality satisfies a threshold condition; and
  a second determining unit to determine that the destination communication apparatus cannot directly communicate without using the repeater when the measured link quality does not satisfy the threshold condition;
  a communication information receiving unit to receive communication information including addresses of communication apparatuses in the PLC network and link qualities between each of communication apparatuses in the PLC network from the repeater; and
  a third determining unit to determine that the destination communication apparatus cannot directly communicate without using the repeater when the link quality for the destination communication apparatus is not measured, but is included in the received communication information; and
a packet transmitting unit to transmit the data packet to the destination communication apparatus when the repeater usage determining unit determines that the destination communication apparatus can directly communicate without using the repeater, and to transmit the data packet to the repeater when the repeater usage determining unit determines that the destination communication apparatus cannot directly communicate without using the repeater.

22. A power line communication system, comprising:
a plurality of power line communication stations;
a repeating unit to selectively repeat transmissions between stations of the plurality of power line communication stations having link qualities that do not satisfy a predetermined threshold condition or stations that cannot directly communicate with each other; and
a coordinating unit to coordinate a medium access of the plurality of power line communication stations, and to periodically transmit scheduling information associated with the coordination to the plurality of power line communication stations through one or more beacon messages.

23. The power line communication system of claim 22, wherein the plurality of power line communication stations, the repeating unit, and the coordinating unit are connected to form a network.

24. A power line communication system, comprising:
a plurality of power line communication stations; and
a repeating unit to selectively repeat transmissions between stations of the plurality of power line communication stations having link qualities that do not satisfy a predetermined threshold condition or stations that cannot directly communicate with each other, wherein at least one station of the plurality of power line communication stations periodically measures link qualities of the plurality of power line communication stations and the repeating unit, and manages addresses and link qualities of the plurality of power line communication stations and of the repeating unit.

25. The power line communication system of claim 24, wherein the at least one station measures the link qualities using response packets received in response to explorer packages broadcast to the plurality of power line communication stations by the at least one station.

26. The power line communication system of claim 24, wherein the at least one station selectively transmits a data packet to a destination station of the plurality of power line communication stations via the repeating unit when the measured link quality of the destination station does not satisfy the predetermined threshold condition.

27. The power line communication system of claim 24, wherein the repeating unit periodically measures the link qualities of the plurality of power line communication stations, and manages the addresses and the link qualities of the plurality of power line communication stations.

28. The power line communication system of claim 27, wherein the at least one station selectively transmits a data packet to a destination station of the plurality of power line communication stations via the repeating unit when the address and link quality of the destination station is not managed by the at least one station and is managed by the repeating unit.

* * * * *